United States Patent
Lafreniere et al.

(10) Patent No.: US 9,321,516 B1
(45) Date of Patent: Apr. 26, 2016

(54) HYBRID PROPULSION SYSTEM FOR A WATERCRAFT

(71) Applicant: CONSORTIUM DE RECHERCHE BRP—UNIVERSITE DE SHERBROOKE S.E.N.C., Sherbrooke (CA)

(72) Inventors: Eric Lafreniere, Saint-Nicephore (CA); Real Dupont, St-Elie-d'Orford (CA); Roger Rioux, Sherbrooke (CA); Simon Richard, Sherbrooke (CA)

(73) Assignee: CONSORTIUM DE RECHERCHE BRP—UNIVERSITE DE SHERBROOKE S.E.N.C., Sherbrooke (CA)

( * ) Notice: Subject to any disclaimer, the term of this patent is extended or adjusted under 35 U.S.C. 154(b) by 142 days.

(21) Appl. No.: 14/169,648

(22) Filed: Jan. 31, 2014

Related U.S. Application Data

(60) Provisional application No. 61/758,866, filed on Jan. 31, 2013.

(51) Int. Cl.
*B63H 21/17* (2006.01)
*B63H 1/14* (2006.01)
*B63H 21/14* (2006.01)
*B63H 21/20* (2006.01)

(52) U.S. Cl.
CPC .................. *B63H 1/14* (2013.01); *B63H 21/14* (2013.01); *B63H 21/17* (2013.01); *B63H 21/20* (2013.01)

(58) Field of Classification Search
CPC ........ B63H 21/20; B60W 20/00; B60K 6/383
See application file for complete search history.

(56) References Cited

U.S. PATENT DOCUMENTS

| | | | |
|---|---|---|---|
| 1,367,771 A * | 2/1921 | Doht et al. | 280/265 |
| 6,857,918 B1 | 2/2005 | Lebreux et al. | |
| 7,473,149 B2 | 1/2009 | Mizokawa | |
| 7,614,924 B2 | 11/2009 | Mizokawa | |
| 7,647,994 B1 * | 1/2010 | Belloso | 180/65.31 |
| 7,938,703 B2 | 5/2011 | Mizokawa | |
| 2007/0169970 A1 * | 7/2007 | Kydd | 180/65.2 |
| 2010/0203777 A1 * | 8/2010 | Bratel | 440/3 |
| 2012/0258639 A1 | 10/2012 | Rolla | |

* cited by examiner

*Primary Examiner* — Edwin Swinehart
(74) *Attorney, Agent, or Firm* — BCF LLP

(57) ABSTRACT

A watercraft propulsion system has a driveshaft, an impeller or a propeller, an overrunning clutch, an electric motor and an internal combustion engine. The overrunning clutch has a first race and a second race. The first race is one of an inner race and an outer race. The second race is an other one of the inner race and the outer race. The first race is connected to the driveshaft for driving the driveshaft. The electric motor has a motor output shaft operatively connected to the first race. The internal combustion engine has an engine output shaft operatively connected to the second race. The overrunning clutch is connected to the motor output shaft and the engine output shaft such that the electric motor is able to selectively rotate the first race at a higher speed than the second race. A watercraft having the propulsion system is also disclosed.

14 Claims, 16 Drawing Sheets

HYBRID PROPULSION SYSTEM FOR A WATERCRAFT

CROSS-REFERENCE

The present application claims priority to U.S. Provisional Patent Application No. 61/758,866, filed Jan. 31, 2013, the entirety of which is incorporated herein by reference.

TECHNICAL FIELD

The present technology relates to hybrid propulsion systems for watercraft.

BACKGROUND

Personal watercraft (PWCs) are typically powered by a two or four stroke internal combustion engine that is connected via a driveshaft to a jet pump. While such engines provide ample power for PWCs, they create both noise and emissions that can be undesirable. For example, many bodies of water include designated "no wake zones" along shores, docks, and/or harbors in which watercraft must maintain a reduced speed. The goal of such zones is to, among other things, limit the amount of noise and emissions created in these zones. When PWCs are operated at low speeds in locations such as these, it is where preventing noise and environmental pollution is a high priority. Farther away from docks, people, and shore, riders tend to drive PWCs faster and increased power is highly desirable.

A desire has therefore developed for a watercraft that can alternately operate at low speeds while minimizing noise and environmental pollution and at higher speeds where increased power is desired.

In the field of land-driven wheeled vehicles such as automobiles, one way environmental and noise concerns have been addressed is to provide a hybrid vehicle that simultaneously and/or alternatively uses an engine and one or more electric motors to power the vehicle.

U.S. Pat. No. 6,857,918, issued Feb. 22, 2015, the entirety of which is incorporated herein by reference, describes various embodiments of hybrid propulsion systems for a watercraft. However, the arrangement of the engine and motor in the various embodiments can be bulky.

There is therefore a need for a hybrid propulsion system for a watercraft in which the engine and motor are in a compact arrangement.

SUMMARY

It is an object of the present technology to ameliorate at least some of the inconveniences present in the prior art.

In one aspect, embodiments of the present technology provide a watercraft propulsion system having a driveshaft, one of an impeller and a propeller connected to the driveshaft, an overrunning clutch, an electric motor and an internal combustion engine. The overrunning clutch has a first race and a second race. The first race is one of an inner race and an outer race. The second race is an other one of the inner race and the outer race. The first race is connected to the driveshaft for driving the driveshaft. The electric motor has a motor output shaft operatively connected to the first race. The internal combustion engine has an engine output shaft operatively connected to the second race. The overrunning clutch is connected to the motor output shaft and the engine output shaft such that the electric motor is able to selectively rotate the first race at a higher speed than the second race.

In a further aspect, the first race is the outer race and the second race is the inner race.

In an additional aspect, a first pulley is connected to the motor output shaft, a second pulley is connected to the first race, and a belt is disposed around the first pulley and the second pulley.

In a further aspect, the outer race is disposed inside the second pulley.

In an additional aspect, the driveshaft, the overrunning clutch and the engine output shaft are coaxial.

In a further aspect, the motor output shaft is offset from the driveshaft.

In an additional aspect, the motor output shaft is parallel to the driveshaft.

In a further aspect, the electric motor is disposed above the driveshaft.

In an additional aspect, the driveshaft and the electric motor are disposed on a first side of the overrunning clutch and the internal combustion engine is disposed on a second side of the overrunning clutch.

In a further aspect, the overrunning clutch is a sprag bearing.

In an additional aspect, at least one control unit connected to the electric motor and the internal combustion engine. The at least one control unit selectively operates the propulsion system between an engine mode and a motor mode. When in the engine mode, the electric motor does not drive the first race, the internal combustion engine drives the second race, the second race drives the first race, and the first race drives the driveshaft and the motor output shaft. When in the motor mode, the electric motor drives the first race, the first race drives the driveshaft, and the first race rotates faster than the second race.

In a further aspect, when in the engine mode, the control unit selectively connects at least one battery used to supply power to the electric motor. When in the engine mode and the at least one battery is connected to the electric motor, the electric motor recharges the battery.

In an additional aspect, the at least one control unit selectively operates the propulsion system between the engine mode, the motor mode and an assisted engine mode. When in the assisted engine mode, the electric motor drives the first race, the internal combustion engine drives the second race, the second race drives the first race, and the first race drives the driveshaft.

In a further aspect, when in the motor mode, the control unit operates the internal combustion engine at idle speed or shuts downs the internal combustion engine.

In an additional aspect, an engine starter is selectively operatively connected to the internal combustion engine to start the internal combustion engine.

In a further aspect, the engine output shaft is a crankshaft of the internal combustion engine.

In another aspect, embodiments of the present technology provide a watercraft having a hull, a deck disposed on the hull, a driveshaft disposed in part between the hull and the deck, one of an impeller and a propeller connected to the driveshaft, an overrunning clutch, an electric motor, and an internal combustion engine. The overrunning clutch has a first race and a second race. The first race is one of an inner race and an outer race. The second race is an other one of the inner race and the outer race. The first race is connected to the driveshaft for driving the driveshaft. The electric motor has a motor output shaft operatively connected to the first race. The electric motor is disposed between the hull and the deck. At least one battery is connected to the electric motor. The internal combustion engine has an engine output shaft operatively connected to the second race. The internal combustion engine is disposed between the hull and the deck. The overrunning clutch is connected to the motor output shaft and the engine output shaft such that the electric motor is able to selectively rotate the first race at a higher speed than the second race.

In an additional aspect, the first race is the outer race and the second race is the inner race.

In a further aspect, a first pulley is connected to the motor output shaft, a second pulley is connected to the first race, and a belt is disposed around the first pulley and the second pulley.

In an additional aspect, the first race is disposed inside the second pulley.

In a further aspect, the driveshaft, the overrunning clutch and the engine output shaft are coaxial.

In an additional aspect, the motor output shaft is offset from the driveshaft.

In a further aspect, the motor output shaft is parallel to the driveshaft.

In an additional aspect, the electric motor is disposed above the driveshaft.

In a further aspect, the driveshaft and the electric motor are disposed on a first side of the overrunning clutch and the internal combustion engine is disposed on a second side of the overrunning clutch.

In an additional aspect, the overrunning clutch is a sprag bearing.

In a further aspect, at least one control unit is connected to the electric motor and the internal combustion engine. The at least one control unit selectively operates the propulsion system between an engine mode and a motor mode. When in the engine mode, the electric motor does not drive the first race, the internal combustion engine drives the second race, the second race drives the first race, and the first race drives the driveshaft and the motor output shaft. When in the motor mode, the electric motor drives the first race, the first race drives the driveshaft, and the first race rotates faster than the second race.

In an additional aspect, when in the engine mode, the control unit selectively connects at least one battery used to supply power to the electric motor. When in the engine mode and the at least one battery is connected to the electric motor, the electric motor recharges the battery.

In a further aspect, the at least one control unit selectively operates the propulsion system between the engine mode, the motor mode and an assisted engine mode. When in the assisted engine mode, the electric motor drives the first race, the internal combustion engine drives the second race, the second race drives the first race, and the first race drives the driveshaft.

In an additional aspect, when in the motor mode, the control unit operates the internal combustion engine at idle speed or shuts downs the internal combustion engine.

In a further aspect, an engine starter is selectively operatively connected to the internal combustion engine to start the internal combustion engine.

In a further aspect, the engine output shaft is a crankshaft of the internal combustion engine.

In an additional aspect, a selector is connected to the at least one control unit for selecting one of the engine mode and the motor mode.

In a further aspect, a straddle seat is connected to the deck, and the one of the impeller and the propeller is the impeller.

For purposes of the present application, terms related to spatial orientation, such as for example "forward", "rearward", "left", "right", "above" and "below" are as they would be understood by a driver of the vehicle sitting thereon in a normal driving position. Also, for purposes of the present application, the term "motor" refers to an electric motor and the term "engine" refers to an internal combustion engine. Definitions provided in the present application take precedence over definitions of the same terms that may be provided in the document that is incorporated herein by reference.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Embodiments of the present technology will be described with respect to a personal watercraft 10. However, it is contemplated that at least some aspects of the present technology could be used in other types of watercraft such as jet boats or boats powered by a propeller for example.

Figure 1:
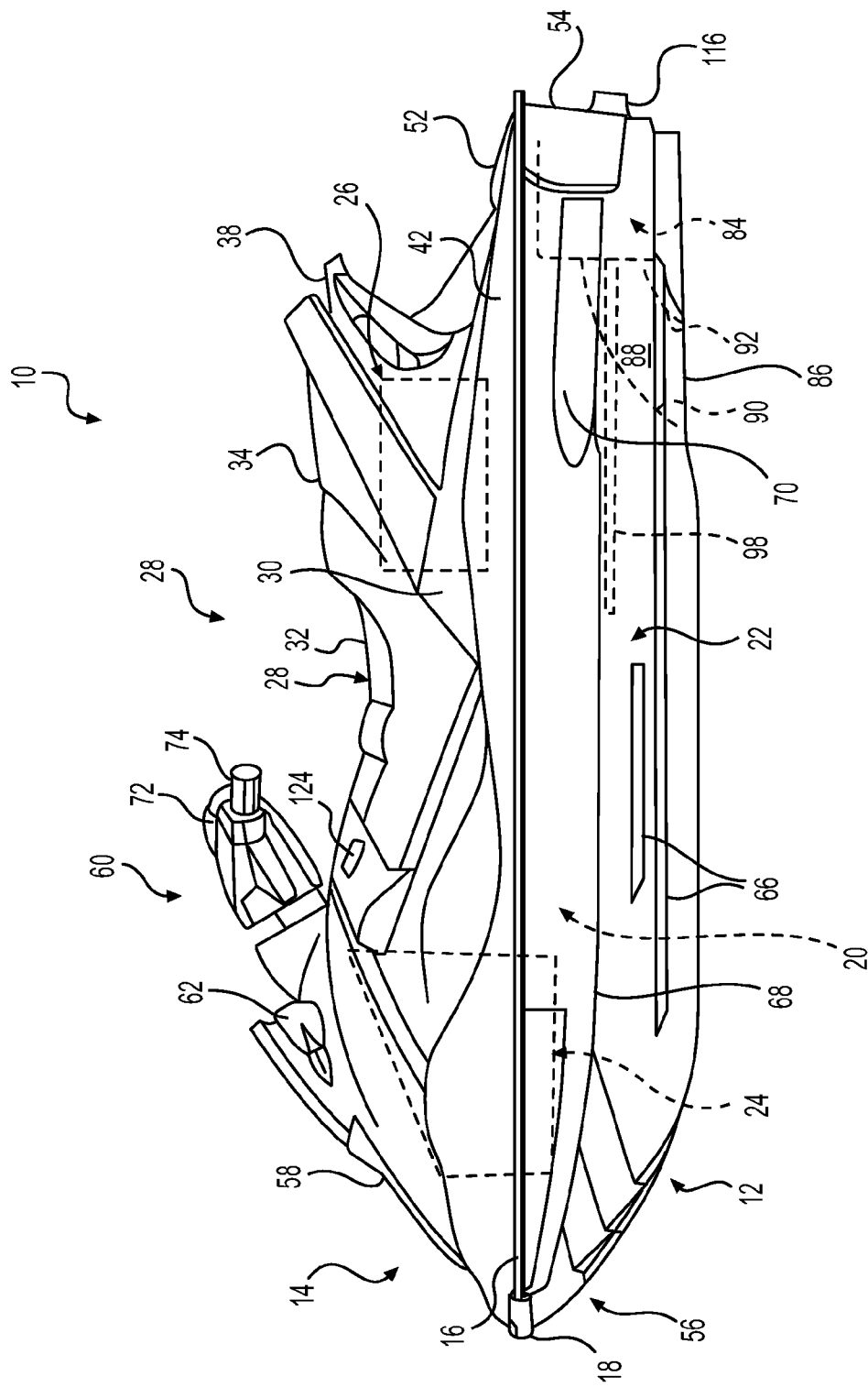
FIG. 1 is a left side elevation view of a personal watercraft.

The personal watercraft 10 will be described with respect to FIGS. 1 to 5. The watercraft 10 of FIG. 1 is made of a hull 12 and a deck 14. The hull 12 buoyantly supports the watercraft 10 in the water. The deck 14 is designed to accommodate a driver and one or more passengers. It is contemplated that the deck 14 could be designed to only accommodate the driver. The hull 12 and deck 14 are joined together at a seam 16 that joins the parts in a sealing relationship. The seam 16 comprises a bond line formed by an adhesive. It is contemplated that other known joining methods could be used to engage the parts together, including, but not limited to, thermal fusion, molding or fasteners such as rivets or screws. A bumper 18 generally covers the seam 16, which helps to prevent damage to the outer surface of the watercraft 10 when the watercraft 10 is docked, for example.

The space between the hull 12 and the deck 14 forms a volume commonly referred to as the engine compartment 20. The engine compartment 20 accommodates an internal combustion engine 100 and an electric motor 102 (FIG. 6), as well as a muffler, fuel tank, electrical system, air box, storage bins 24, 26, and other elements required or desirable in the watercraft 10. The engine 100 and motor 102 will be described in greater detail below.

Figure 2:
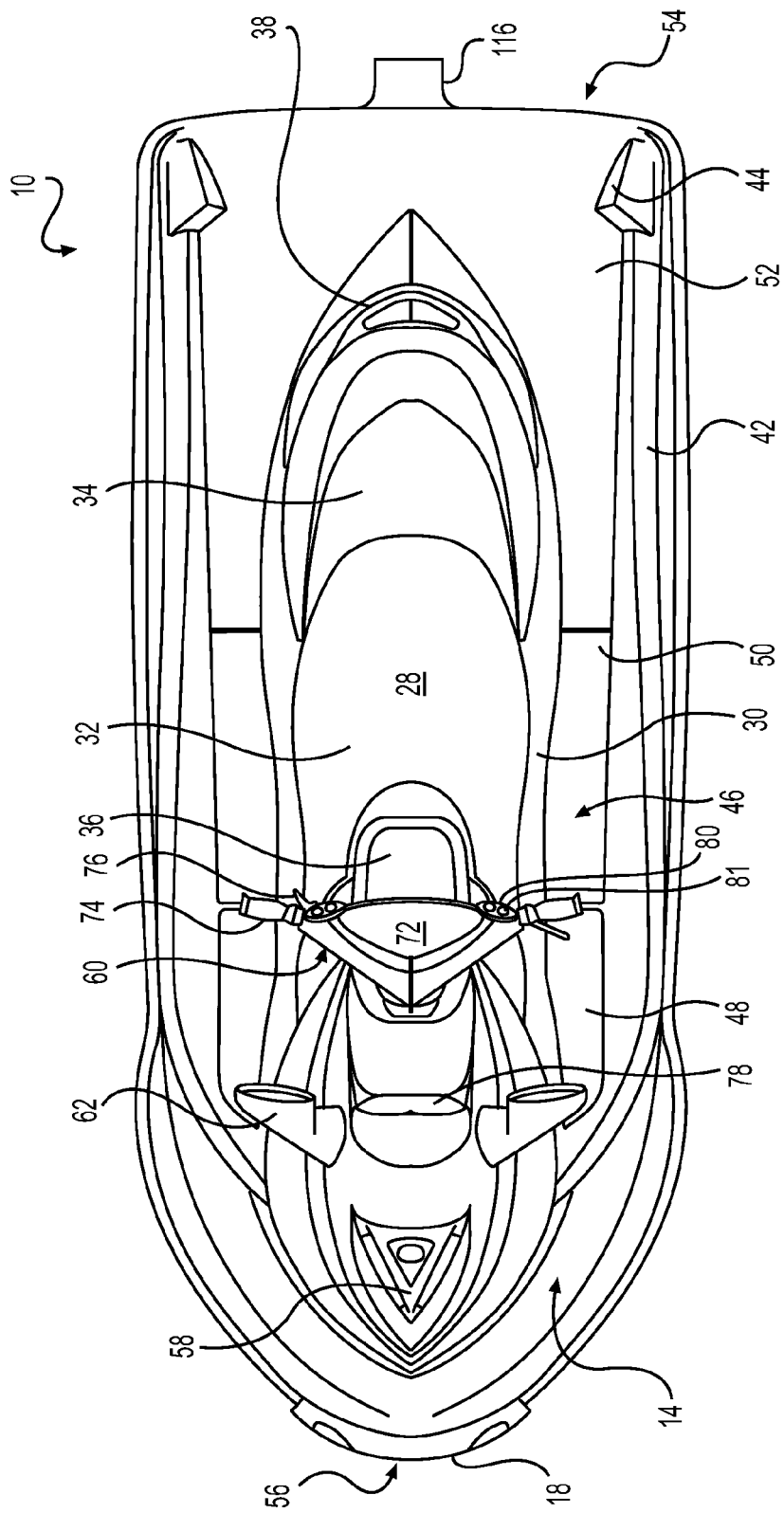
FIG. 2 is a top elevation view of the watercraft of FIG. 1.

As seen in FIGS. 1 and 2, the deck 14 has a centrally positioned straddle-type seat 28 positioned on top of a pedestal 30 to accommodate the driver and passenger(s) in a straddling position. The seat 28 includes a front seat portion 32 and a rear seat portion 34. The seat portions 32, 34 are removably attached to the pedestal 30 by a hook and tongue assembly (not shown) at the front of each seat portion 32, 34 and by a latch assembly (not shown) at the rear of each seat portion 32, 34. The seat portion covers an access opening defined by a top portion of the pedestal 30 to provide access to the engine compartment 20. The seat portion 34 covers a removable storage box 26. A small storage box 36 is provided in front of the seat 28.

Figure 4:
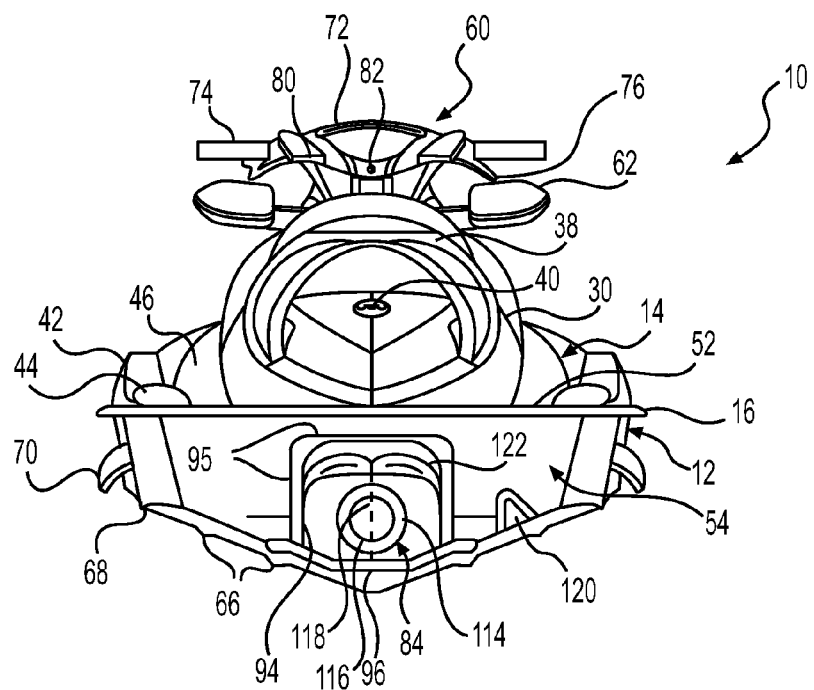
FIG. 4 is a rear elevation view of the watercraft of FIG. 1.

As seen in FIG. 4, a grab handle 38 is provided between the pedestal 30 and the rear of the seat 28 to provide a handle onto which a passenger may hold. Beneath the handle 38, a tow hook 40 is mounted on the pedestal 30. The tow hook 40 can be used for towing a skier or floatation device, such as an inflatable water toy.

As best seen in FIGS. 2 and 4, the watercraft 10 has a pair of generally upwardly extending walls located on either side of the watercraft 10 known as gunnels 42. The gunnels 42 help to prevent the entry of water in the footrests 46, provide lateral support for the rider's feet, and also provide buoyancy when turning the watercraft 10. Toward the rear of the watercraft 10, the gunnels 42 extend inwardly to act as heel rests 44. Heel rests 44 allow a passenger riding the watercraft 10 facing towards the rear, to spot a water-skier for example, to place his or her heels on the heel rests 44, thereby providing a more stable riding position. Heel rests 44 could also be formed separately from the gunnels 42.

Located on both sides of the watercraft 10, between the pedestal 30 and the gunnels 42 are the pair of footrests 46. The footrests 46 are designed to accommodate a rider's feet in various riding positions. The footrests 46 each have a forward portion 48 angled such that the front portion of the forward portion 48 is higher, relative to a horizontal reference point, than the rear portion of the forward portion 48. The remaining portions of the footrests 46 are generally horizontal. The footrests 46 are covered by carpeting 50 made of a rubber-type material, for example, to provide additional comfort and traction for the feet of the riders.

A reboarding platform 52 is provided at the rear of the watercraft 10 on the deck 14 to allow the driver or a passenger to easily reboard the watercraft 10 from the water. Carpeting or some other suitable covering covers the reboarding platform 52. A retractable ladder (not shown) may be affixed to the transom 54 to facilitate boarding the watercraft 10 from the water onto the reboarding platform 52.

Figure 3:
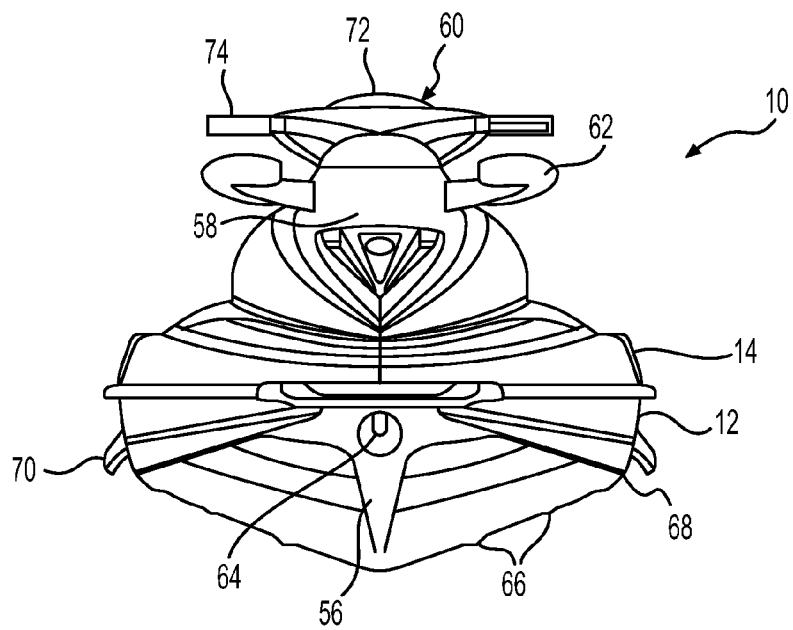
FIG. 3 is a front elevation view of the watercraft of FIG. 1.

As seen in FIGS. 2 and 3, the bow 56 of the watercraft 10 is provided with a hood 58 located forwardly of the seat 28 and a helm assembly 60. A hinge (not shown) is attached between a forward portion of the hood 58 and the deck 14 to allow the hood 58 to move to an open position to provide access to the front storage bin 24 (FIG. 1). A latch (not shown) located at a rearward portion of the hood 58 locks the hood 58 into a closed position. When in the closed position, the hood 58 prevents water from entering front storage bin 24. Rearview mirrors 62 are positioned on both sides of the hood 58 to allow the rider to see behind the watercraft 10. A hook 64 is located at the bow 56 of the watercraft 10. The hook 64 is used to attach the watercraft 10 to a dock when the watercraft 10 is not in use or to attach to a winch when loading the watercraft on a trailer, for instance.

Figure 5:
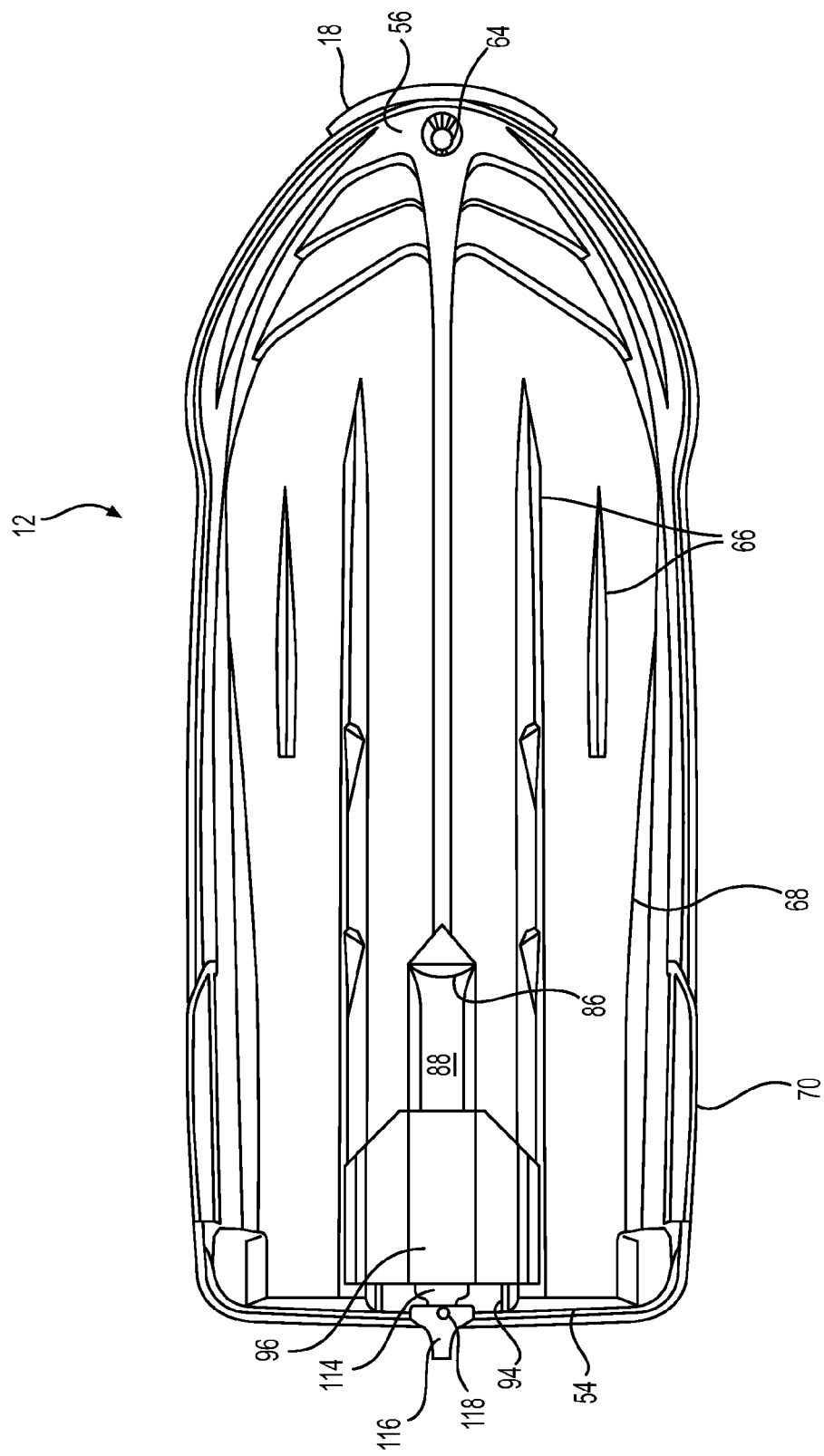
FIG. 5 is a bottom plan view of the watercraft of FIG. 1.

As best seen in FIGS. 3, 4, and 5, the hull 12 is provided with a combination of strakes 66 and chines 68. A strake 66 is a protruding portion of the hull 12. A chine 68 is the vertex formed where two surfaces of the hull 12 meet. The combination of strakes 66 and chines 68 provide the watercraft 10 with its riding and handling characteristics. Sponsons 70 are located on both sides of the hull 12 near the transom 54. The sponsons 70 have an arcuate undersurface that gives the watercraft 10 both lift while in motion and improved turning characteristics. The sponsons 70 are attached to the hull by fasteners. It is contemplated that the position of the sponson 70 with respect to the hull 12 could be adjustable.

The helm assembly 60 is positioned forwardly of the seat 28. The helm assembly 60 has a padded central helm portion 72 and a pair of steering handles 74. One of the steering handles 74 is provided with a throttle lever 76 that allows the driver to control the speed of the watercraft 10. As seen in FIG. 2, a display cluster 78 is located forwardly of the helm assembly 60. The display cluster 78 can be of any display type, including a liquid crystal display (LCD), dials or light emitting diodes (LEDs). The central helm portion 72 also has various buttons 80, that could alternatively be in the form of levers or switches or any other type of selector, that allow the driver to modify the display data or mode (speed, engine rpm, time . . . ) on the display cluster 78 or to change a condition of the watercraft 10 such as trim (the pitch of the watercraft).

One of the buttons 80 on the helm portion 72 is a "shore" button 81 that can be activated by the driver when the watercraft 10 is near the shore, a dock, etc. to limit the speed and noise of the watercraft 10. The shore button 81 is operatively connected to an electronic control unit 104 (FIG. 7) to control the propulsion system of the watercraft 10. By activating the shore button 81 as described in detail below, the driver can request that the watercraft 10 be powered only by the electric motor 102 as will be described in greater detail below.

The helm assembly 60 is also provided with a key receiving post 82 near a center of the central helm portion 72. The key receiving post 82 is adapted to receive a key (not shown) that starts the watercraft 10. The key is typically attached to a safety lanyard (not shown). It is contemplated that the key receiving post 82 could be placed in any suitable location on the watercraft 10.

Figure 6:
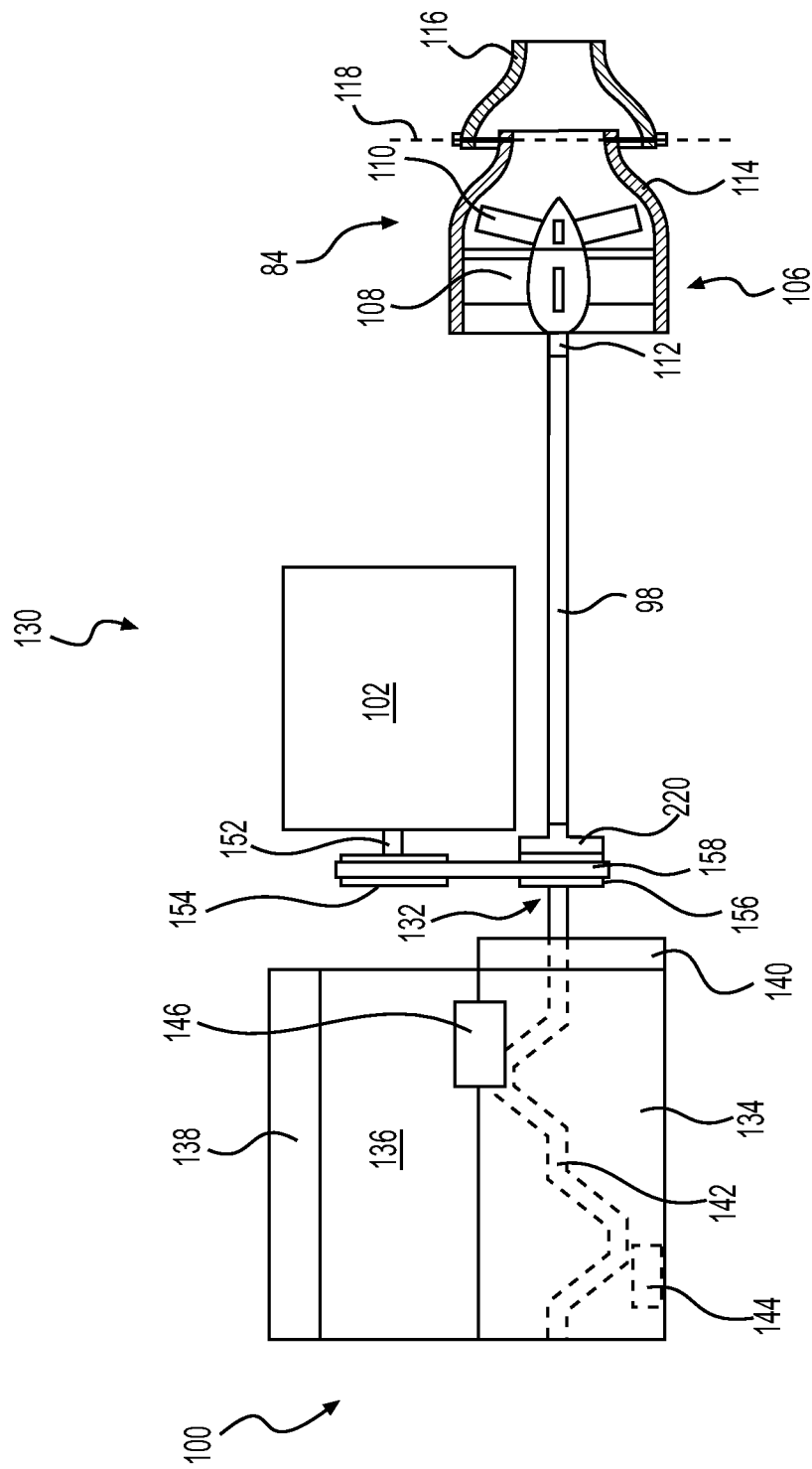
FIG. 6 is a schematic left side elevation view of the propulsion system of the watercraft of FIG. 1.

The watercraft 10 is propelled by a jet propulsion system 84 that includes a jet pump 106 (FIG. 6). The jet propulsion system 84 pressurizes water to create thrust. The water is first scooped from under the hull 12 through an inlet 86, which has an inlet grate. The inlet grate prevents large rocks, weeds, and other debris from entering the jet propulsion system 84, which may damage the system or negatively affect performance. Water flows from the inlet 86 through a water intake ramp 88. The top portion 90 of the water intake ramp 88 is formed by the hull 12, and a ride shoe (not shown in detail) forms its bottom portion 92. Alternatively, the intake ramp 88 may be a single piece or an insert to which the jet propulsion system 84 attaches. In such cases, the intake ramp 88 and the jet propulsion system 84 are attached as a unit in a recess in the bottom of hull 12.

From the intake ramp 88, water enters the jet propulsion system 84. The jet propulsion system 84 is located in a formation in the hull 12, referred to as the tunnel 94. The tunnel 94 is defined at the front, sides and top by the hull 12 and is open at the transom 54. The bottom of the tunnel 94 is closed by the ride plate 96. The ride plate 96 creates a surface on which the watercraft 10 rides or planes at high speeds.

As can be seen in FIG. 6, the jet pump 106 includes an impeller 108 and a stator 110. The impeller 108 is coupled an impeller shaft 112. The impeller shaft 112 is connected to the driveshaft 98 by splines. The driveshaft 98 is operatively connected to the engine 100 and the motor 102 as will be described below. The rotation of the impeller 108 pressurizes the water, which then moves over the stator 110 that is made of a plurality of fixed stator blades. The role of the stator blades is to decrease the rotational motion of the water so that almost all the energy given to the water is used for thrust, as opposed to swirling the water. Once the water leaves the jet pump 106, it goes through a venturi 114. Since the exit diameter of the venturi 114 is smaller than its entrance diameter, the water is accelerated further, thereby providing more thrust. A steering nozzle 116 is pivotally attached to the venturi 114 so as to pivot about a vertical axis 118. The steering nozzle 116 could also be supported at the exit of the tunnel 94 in other ways without a direct connection to the venturi 114. Alternatively, a steering rudder could be positioned at the outlet of the venturi 114 to selectively divert the thrust to effect steering.

The steering nozzle 116 is operatively connected to the helm assembly 60 via a push-pull cable (not shown) such that when the helm assembly 60 is turned, the steering nozzle 116 pivots. This movement redirects the thrust from the venturi 114, so as to steer the watercraft 10 in the desired direction. Optionally, the steering nozzle 116 may be gimballed to allow it to move around a second horizontal pivot axis. The up and down movement of the steering nozzle 116 provided by this additional pivot axis is known as trim and controls the pitch of the watercraft 10.

It is contemplated that in other types of watercraft, the impeller 112 could be replaced by a propeller disposed outside the hull 12.

When the watercraft 10 is moving, its speed is measured by a speed sensor 120 (FIG. 4) attached to the transom 54 of the watercraft 10. The speed sensor 120 has a paddle wheel that is turned by the flow of water. In operation, as the watercraft 10 goes faster, the paddle wheel turns faster correspondingly. The electronic control unit 104 is connected to the speed sensor 120 and converts the rotational speed of the paddle wheel to the speed of the watercraft 10 in kilometers or miles per hour, depending on the driver's preference. The speed sensor 106 may also be placed in the ride plate 96 or at any other suitable position. Other types of speed sensors, such as pitot tubes, and GPS units could be used.

A reverse gate 122 (FIG. 4) is pivotally attached to the sidewalls of the tunnel 94. Alternatively, the reverse gate could be connected to the venturi 114 or the steering nozzle 116. To make the watercraft 10 move in a reverse direction, the driver pulls on a reverse handle 124 (FIG. 1) operatively connected to the reverse gate 122. In response, the reverse gate 122 pivots in front of the outlet of the steering nozzle 116 and redirects the water exiting the jet propulsion system 84 towards the front of the watercraft 10, thereby thrusting the watercraft 10 rearward. The reverse handle 124 can be located in any convenient position near the driver, for example adjacent the seat 28 as shown or on the helm 60.

Turning now to FIGS. 6 to 10, a propulsion system 130 of the watercraft 10 will be described. The propulsion system 130 includes the engine 100, the motor 102, the driveshaft 98, the jet propulsion system 84 and an overrunning clutch 132.

The engine 100 is a four-stroke, two-cylinder engine. It is contemplated that other types of engines with more or less cylinders could be used. For example, it is contemplated that a two-stroke, three-cylinder engine could be used. The engine 100 has a crankcase 134, connected to cylinder block 136 and a cylinder head 138. The cylinder head 138 contains the intake and exhaust valves (not shown), the camshafts and cams (not shown) to actuate the valves and the spark plugs (not shown). The cylinder block 136 defines the two cylinders and the intake and exhaust ports (not shown). Pistons (not shown) are received in the cylinders. A magneto cover 140 is connected to an end of the crankcase 134. A crankshaft 142 is rotationally supported inside the crankcase 134. The crankshaft 142 is connected to the pistons by connecting rods (not shown). The crankshaft 140 extends through an end of the crankcase 134 and through the magneto cover 140. A magneto (not shown) is mounted to the crankshaft 142 in the space between the crankcase 134 and the magneto cover 140. As the crankshaft 142 rotates, the magneto generates electricity to power various onboard electrical systems. It is contemplated that the magneto could be omitted. The end of the crankshaft 142 that extends through the magneto cover 140 is connected to the overrunning clutch 132 as will be described in greater detail below. As such, in the present embodiment, the crankshaft 142 is the engine output shaft of the engine 100. It is contemplated that in some embodiments, the engine output shaft could be a shaft of the engine 100 other than the crankshaft 142, such as a counterbalance shaft for example. It is also contemplated that a transmission including a set of gears could be provided between the crankshaft 142 and the engine output shaft. A lubricant pump 144 is disposed in the crankcase 134. The lubricant pump 144 is operatively connected to the crankshaft 142 so as to be driven by the crankshaft 142. It is contemplated that the lubricant pump 144 could be an electrical pump. The lubricant pump 144 pumps lubricant from the crankcase 140 and delivers it to various locations in the engine 100, including the crankshaft 142, and, as will be described in greater detail below, to the overrunning clutch 132. The engine 100 is provided with a starter motor 146 selectively connected to the crankshaft 142 to provide the initial rotations of the crankshaft 142 necessary to start the engine 100. The engine 100 has many other components which, for simplicity, will not be described herein. A fuel system and air intake system (not shown) provide the engine 100 with fuel and air respectively. An exhaust system (not shown) connected to the exhaust ports of the engine 100 takes the exhaust gases from the engine 100 and delivers them to the atmosphere and/or the body of water in which the watercraft 10 operates. The operation of the engine 100 is controlled by the ECU 104 based at least in part on signals received from a sensor reading a position of the throttle lever 76, the shore button 81 and the speed sensor 120 as will be described in greater detail below.

Figure 7:
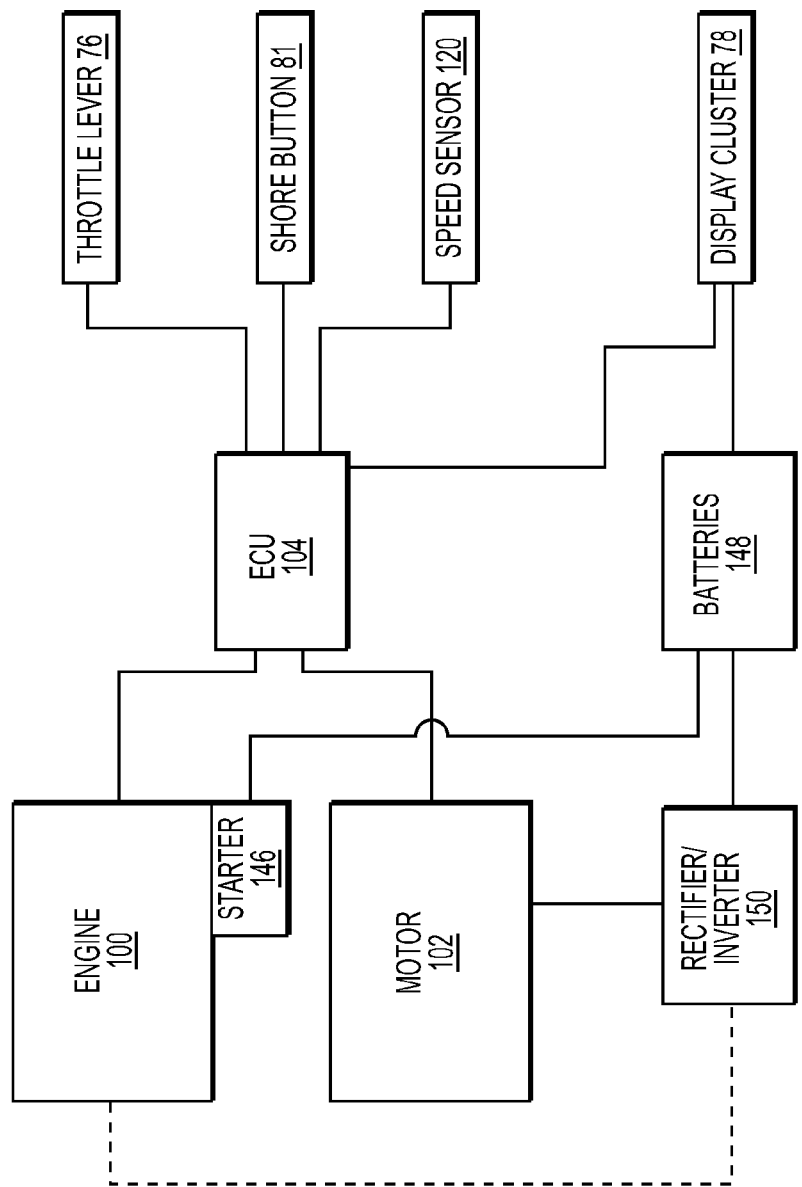
FIG. 7 is a schematic illustration of an electrical/electronic system of the watercraft of FIG. 1.
Figure 8:
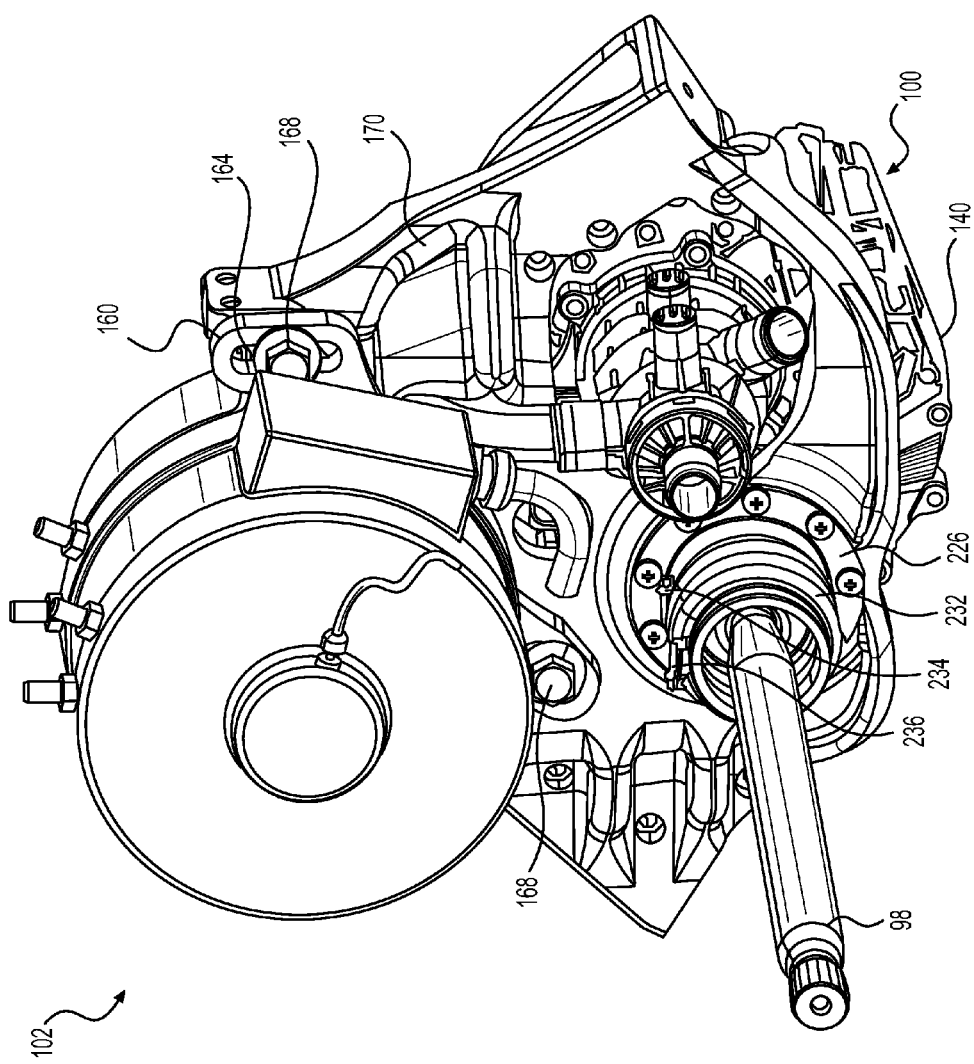
FIG. 8 is a perspective view taken from a rear, right side of the portion of the propulsion system of FIG. 6.
Figure 9:
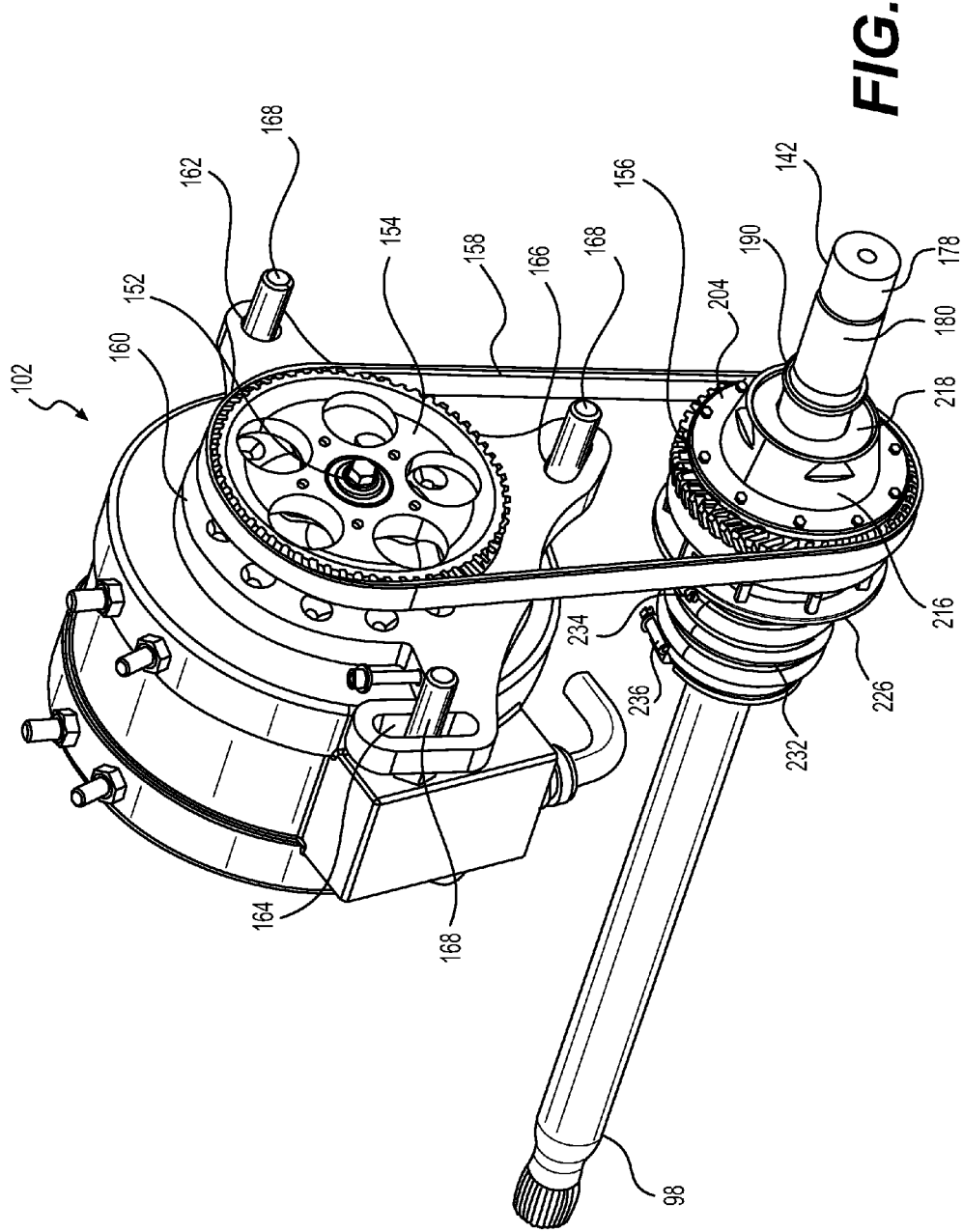
FIG. 9 is a perspective view taken from a front, right side of the portion of the propulsion system of FIG. 6 with the motor support and internal combustion engine removed.
Figure 10:
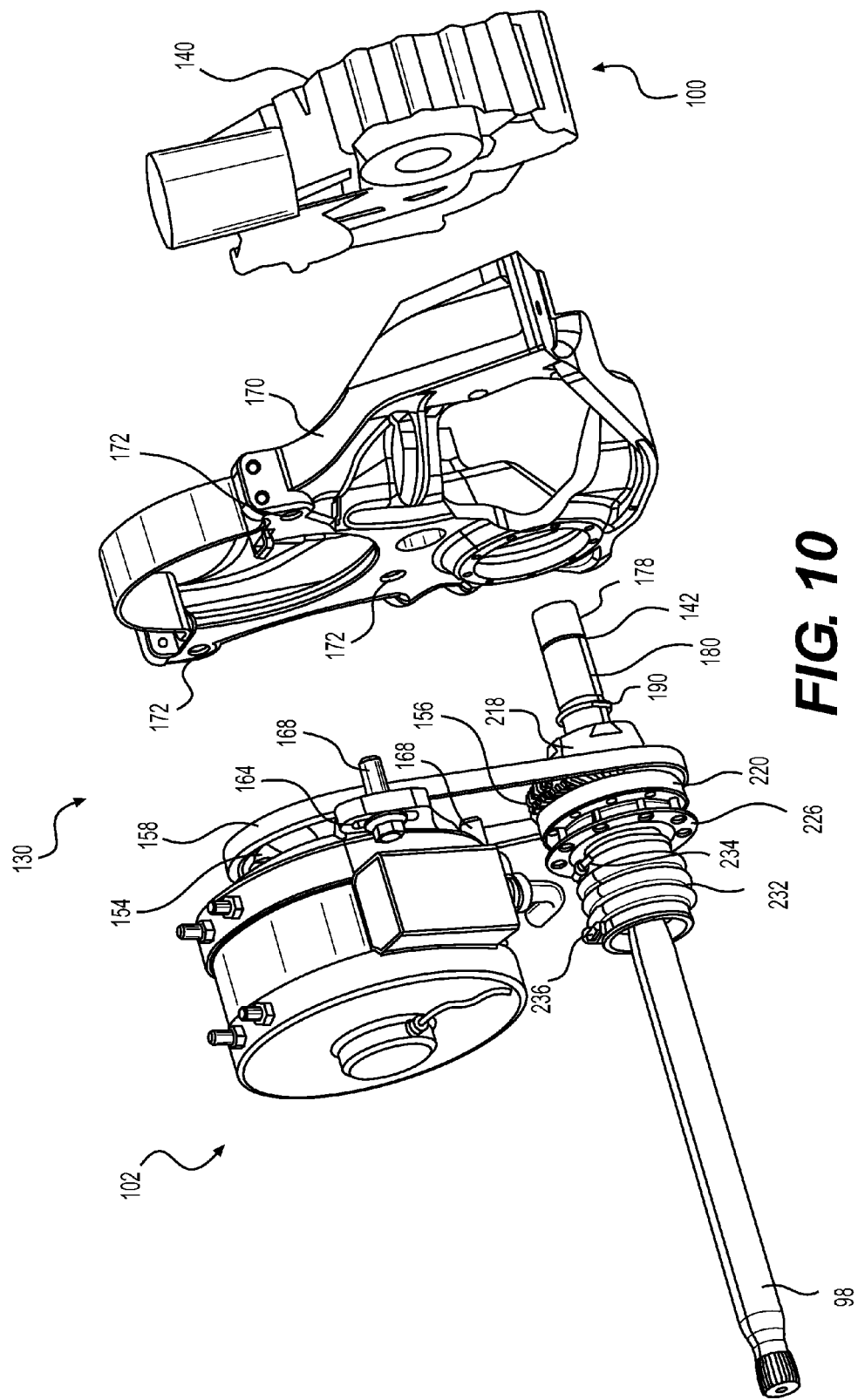
FIG. 10 is a partially exploded view of the portion of the propulsion system of FIG. 6.
Figure 11:
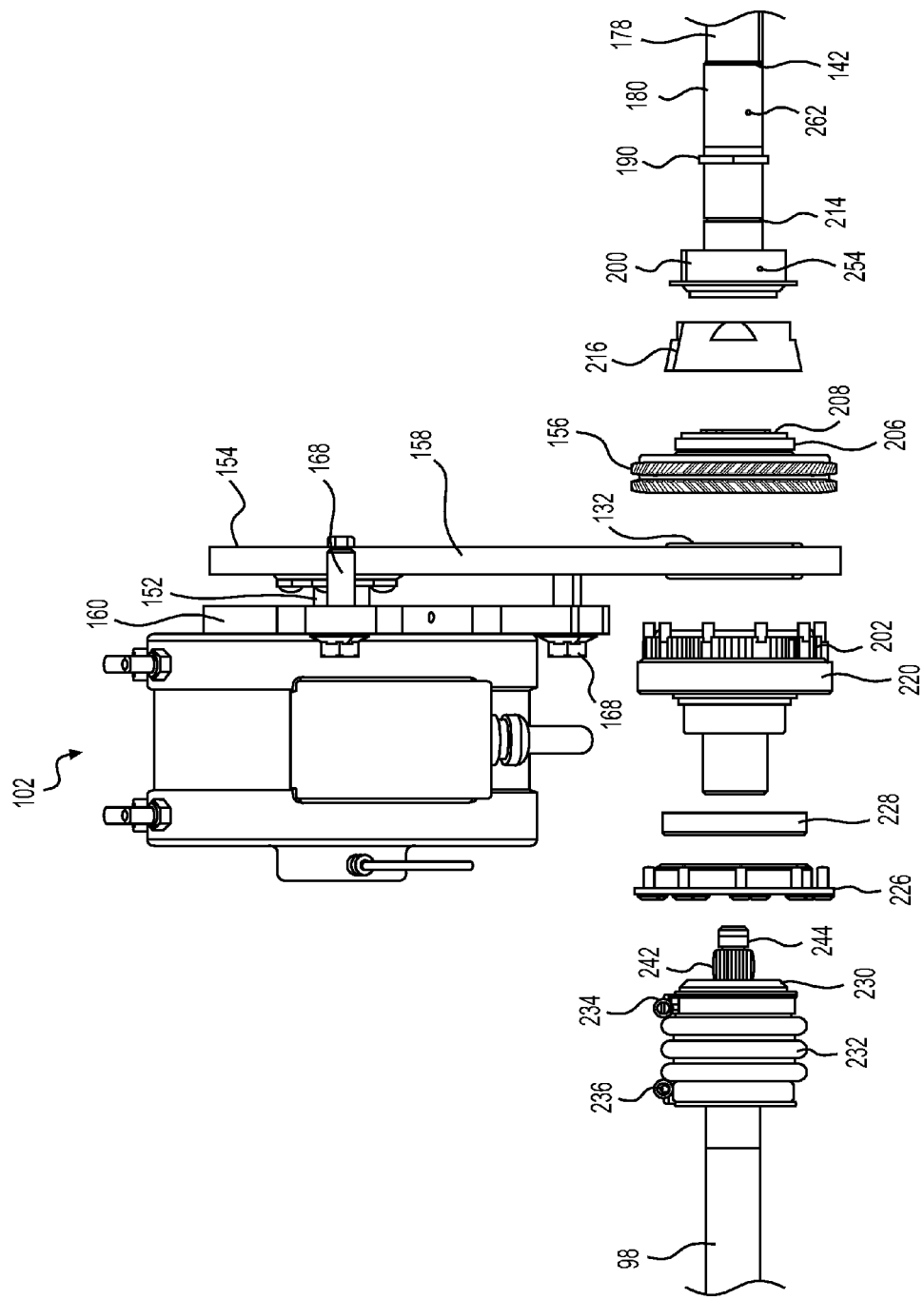
FIG. 11 is another partially exploded view of the portion of the propulsion system of FIG. 6.
Figure 12:
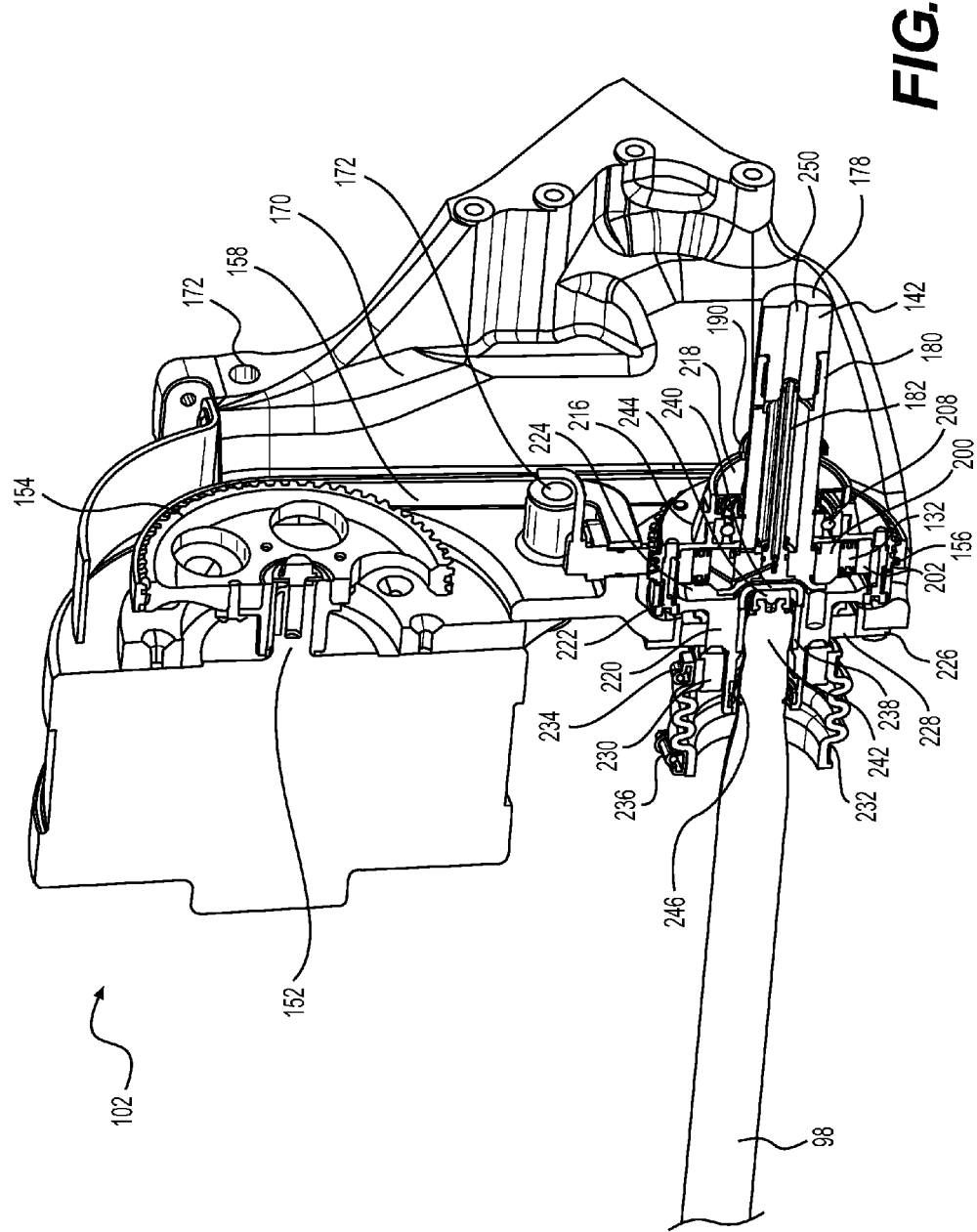
FIG. 12 is a longitudinal cross-section of the portion of the propulsion system of FIG. 6 with the internal combustion removed.

The electric motor 102 is a synchronous motor having permanent magnets mounted to a rotor (not shown) and wire coils mounted to a fixed armature (not shown). It is contemplated that other types of electric motors could be used. The electric motor 102 is electrically connected to a plurality of batteries 148 (FIG. 7). The batteries 148 are disposed in the hull 12 on both sides of the driveshaft 98. The batteries 148 include two-types of batteries: high voltage batteries (42V or more, for example a 48V lithium-ion pack) for powering the motor 102 and low voltage batteries (12V for example) for powering other elements of the watercraft 10 such as the ECU 104, the starter motor 146 and the display cluster 78. To power the motor 102, the high voltage batteries 148 supply DC power to a rectifier/inverter 150 (FIG. 7) that converts it to AC power and supplies the AC power to the coils of the motor 102. The frequency of the AC power supplied to the motor 102 is controlled by the ECU 104 and determines the speed of rotation of the rotor of the motor 102. The motor 102 can also be used to recharge the batteries 148 by driving the rotor of the motor 102 with the engine 100 as will be described in greater detail below. When the rotor is turned by the engine 100, AC power is generated in the coils of the motor 102. This AC power is supplied to the rectifier/inverter 150 that converts it to DC power and supplies it to the batteries 148 to recharge the batteries 148. The high voltage batteries of 148 are charged by the motor 102 and the low voltage batteries of 148 are charged by the high voltage batteries 148. The magneto is needed when the high voltage batteries 148 are discharged and not able to supply power to the low voltage batteries 148. It is contemplated that the rectifier/inverter 150 could be integrated in the motor 102. It is contemplated that a charger (not shown) could be provided to permit the batteries 148 to be recharged by plugging the charger in a power outlet when the watercraft 10 is not in use.

Although the present embodiment uses a single ECU 104 to control the operation of the engine 100 and the motor 102, it is contemplated that separate modules could be used, each controlling the engine 100 or the motor 102 or a specific aspect of the operation of the engine 100 and/or motor 102 which together form the ECU 104.

The motor 102 has a motor output shaft 152 connected to the rotor. A pulley 154 is connected to the end of the motor output shaft 152. Another pulley 156 is connected to the overrunning clutch 132 as will be described in greater detail below. In the present embodiment, the diameter of the pulley 154 is greater than the diameter of the pulley 156 but it is contemplated that they could have the same diameter or that the diameter of the pulley 154 could be smaller than the diameter of the pulley 156. A belt 158 is disposed around the pulleys 154, 156 to transfer torque from one to the other. The belt 158 has internal teeth (not shown) arranged in a chevron pattern that engage corresponding teeth arranged in chevron patterns on the pulleys 154, 156. It is contemplated that different types of belts and pulleys could be used such as a V-belt with correspondingly grooved pulleys. It is also contemplated that the torque could be transmitted between the motor output shaft 152 and the overrunning clutch by other means. For example, the belt 158 and pulleys 154, 156 could be replaced by a chain and sprockets or by gears.

The motor 102 has a support 160 (best seen in FIG. 9) disposed around the motor output shaft 152 between the housing of the motor 102 and the pulley 154. The support 160 has one aperture 162 and two slots 164, 166. Fasteners 168 inserted in the aperture 162 and slots 164, 166 fasten the support 160, and therefore the motor 102, to a motor mount 170 having three apertures 172 (FIG. 10) to receive the fasteners 168. The motor mount 170 is disposed between the motor 102 and the engine 100. The motor mount 170 is fastened to the bottom of the hull 12 via rubber mounts (not shown). The slots 164, 166 allow adjustment of the position of the motor 102 in order to properly tension the belt 158. The support 160 houses the pulleys 154, 156, the belt 158 and the overrunning clutch 132. It is contemplated that more or less apertures 162 and/or slots 164, 166 could be provided with a corresponding number of fasteners 168 and apertures 172. It is also contemplated that the slots 164, 166 could be replaced with apertures and that a separate tensioning system could be provided to tension the belt 158.

As can be seen in FIG. 6, the engine 100 is disposed in front of the overrunning clutch 132 and the motor 102 is disposed behind the overrunning clutch 132. The motor 102 is disposed above the driveshaft 98 such that the motor output shaft 152 is vertically offset from and parallel to the driveshaft 98. The crankshaft 142, the overrunning clutch 132 and the driveshaft 98 are coaxial.

Figure 13:
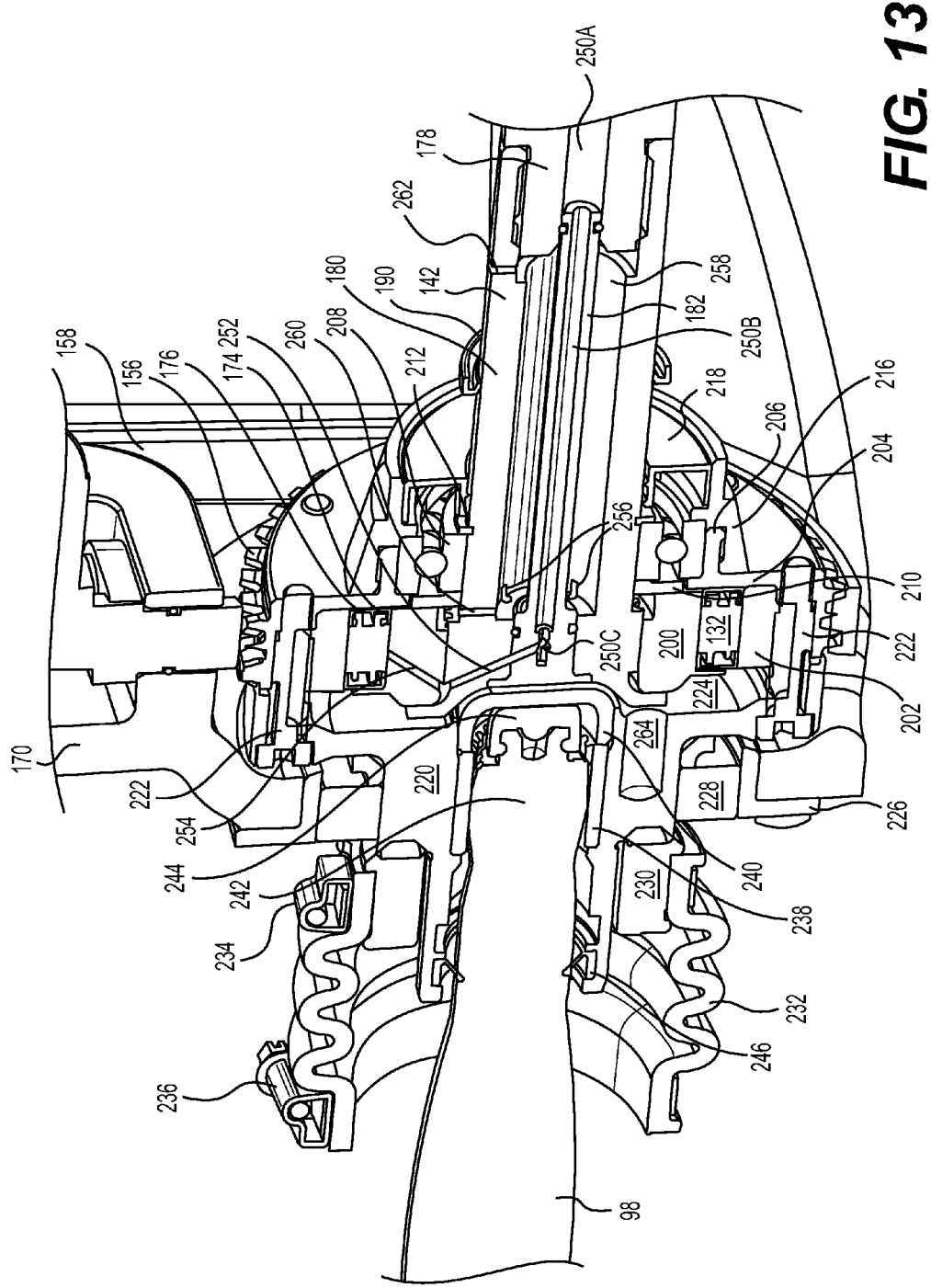
FIG. 13 is a close-up view of a portion of FIG. 12.

The overrunning clutch 132 is a sprag bearing having an inner race 174, an outer race 176 (FIG. 13) and a plurality of sprags (not shown) disposed between the races 174, 176. The sprags of the overrunning clutch 132 are arranged so as to permit the outer race 176 to be rotated in the normal direction of rotation of the crankshaft 142 faster than the inner race 174 and to permit the outer race 176 and inner race 174 to rotate together in the normal direction of rotation of the crankshaft 142 by having the inner race 174 drive the outer race 176. However, the inner race 174 cannot be rotated faster than the outer race 176 in the normal direction of rotation of the crankshaft 142. It is contemplated that other types of overrunning clutches could be used such as a ratcheting freewheel for example. In the present embodiment, the crankshaft 142 is connected to the inner race 174, the pulley 156, which is connected to the motor output shaft 152, is connected to the outer race 176, and the driveshaft 98 is connected to the outer race 76 as will be described in greater detail below.

The manner in which the engine 100, motor 102, overrunning clutch 132 and driveshaft 98 are connected permits the operation of the propulsion system 130 in various modes. The ECU 104 determines the mode in which the propulsion system 130 should operate and controls the operation of the propulsion system 130 in its various modes. The propulsion system 130 can be operated in an engine mode, a motor mode or an assisted engine mode. It should be understood that the name of the various modes could differ from those used herein but that regardless of their names, these differently named modes could nonetheless cause the propulsion system 130 to operate as described below.

In the engine mode, the ECU 104 controls a speed of operation of the engine 100 based at least in part on signals received for the position sensor of the throttle lever 76 and the watercraft speed sensor 120. In this mode, the batteries 148 do not power the electric motor 102. As a result, the pulley 154 does not drive the pulley 156 and therefore does not drive the outer race 176 of the overrunning clutch 132. As such, the rotation of the crankshaft 142 causes the inner and outer races 174, 176 to rotate together. As a result, the outer race 176 drives the driveshaft 98 and also drives the motor 102 via the pulleys 154, 156 and the belt 158. Therefore, the motor 102 can generate electricity as described above. If the batteries 148 are not fully charged or are charged below a predetermined threshold, the ECU 104 connects the batteries 148 to the motor 102 such that the motor 102 can recharge the batteries 148. If the batteries are fully charged or charged above a predetermined threshold, the ECU 104 disconnects the batteries 148 from the motor 102 so as to not overcharge the batteries 148. The ECU 104 also connects or disconnects the magneto of the engine 100 from the batteries 148 to selectively charge the batteries 148. The ECU 104 operates the propulsion system 130 in the engine mode when the shore button 81 is not actuated by the driver of the watercraft 10, or when the shore button 81 is pressed by the driver of the watercraft 10 but the charge level of the batteries 148 is too low to operate the motor 102. It is contemplated that when the shore button 81 is pressed by the driver of the watercraft 10 but the charge level of the batteries 148 is too low to operate the motor 102 that the ECU 104 could send a signal to the display cluster 78 such as "low charge" to indicate to the driver why the electric motor 102 is not operating. It is contemplated that when the shore button 81 is actuated by the driver of the watercraft 10 but the charge level of the batteries 148 is too low to operate the motor 102 that the ECU 104 could control the engine 100 to limit the maximum speed of the watercraft 10 to a low speed, such as 7 km/h for example, that is acceptable for operation of the watercraft 10 near docks or the shore.

In the motor mode, the engine 100 is shut down and the ECU 104 connects the batteries 148 to the motor 102 to supply power to the motor 102. As a result, the motor output shaft 152 drives the pulley 154 that drives the pulley 156, and therefore the outer race 176 of the overrunning clutch 132, via the belt 158 to drive the driveshaft 98. As the engine 100 does not operate, the inner race 174 of the overrunning clutch 132 does not rotate. It is contemplated that instead of shutting down the engine 100 in the motor mode, the ECU 104 could cause the engine 100 to operate at idle speed or a some other low speed, in which case the crankshaft 142 rotates the inner race 174, but at a lower speed than the speed at which the electric motor 102 rotates the outer race 176. The ECU 104 operates the propulsion system in the motor mode when the shore button 81 is actuated by the driver of the watercraft 10 and the charge level of the batteries 148 is above a predetermined threshold. If the charge level of the batteries 148 is too low, the ECU 104 operates the propulsion system 130 in the engine mode as indicated above. In the motor mode, the ECU 104 controls the operation of the motor 102 based at least in part on signals received for the position sensor of the throttle lever 76 and the watercraft speed sensor 120, but will not cause the watercraft to exceed a predetermined low speed, such as 7 km/h for example, that is acceptable for operation of the watercraft 10 near docks or the shore. It is contemplated that this speed limitation could be omitted. In one embodiment, the batteries 148 only store enough electrical power to permit operation in the motor mode for a short period of time, such as 5 minutes for example, which corresponds to an amount of time typically spent by a watercraft 10 to dock or to leave the docks and/or a "no wake zone". It is contemplated that the batteries 148 could store enough electrical power to permit longer operation in the motor mode, but as would be understood this would require more batteries 148 which increases the weight of the watercraft 10 and/or more efficient batteries 148 which increases the cost of the watercraft 10. However, in some designs, the advantages provided by a longer operation in the motor mode could outweigh the disadvantages listed above. It is also contemplated that the ECU 104 could automatically operate the propulsion system 130 in the motor mode when the signal received by the ECU 104 from the speed sensor 120 indicates that the watercraft 10 is below a predetermined speed and the charge level of the batteries 148 is above a predetermined threshold. In such an embodiment, it is contemplated that the shore button 81 could be omitted.

In the assisted engine mode, the ECU operates the engine 100 as in the engine mode described above and connects the batteries 148 to the motor 102 to supply power to the motor 102. As a result, the crankshaft 142 of the engine 100 drives the driveshaft 98 via the overrunning clutch 132 as described above in the engine mode, and by running the motor 102 with the batteries 148, the load on the engine 100 caused by the motor 102 is reduced compared to the engine mode, thus providing the propulsion system 130 with a "boost". This boost could be a vehicle speed boost or a boost in fuel consumption efficiency of the engine 100 depending on how the ECU 104 operates the engine 100 in the assisted engine mode. The ECU 104 operates the propulsion system 130 in the assisted engine mode when the shore button 81 is not actuated by the driver of the watercraft 10 and the charge level of the batteries 148 is above a predetermined threshold. In the present embodiment, the ECU 104 operates the propulsion system 130 automatically in the engine assisted mode when these conditions are met. It is contemplated that the ECU 104 could only operate the propulsion system 130 in the engine assisted mode when the above conditions are met and when the watercraft 10 is operating above a predetermined speed. It is also contemplated that the watercraft 10 could be provided with a boost button to be actuated by the driver of the watercraft 10 and connected to the ECU 104. In such an embodiment, the ECU 104 operates the propulsion system 130 in the assisted engine mode when the boost button is actuated by the driver of the watercraft 10 and the charge level of the batteries 148 is above a predetermined threshold.

Turning now to FIGS. 11 to 16, the crankshaft 142, the driveshaft 98 and the manner in which the crankshaft 142, the driveshaft 98 and the pulley 156 are connected to the overrunning clutch 132 will be described in more detail.

Figure 14:
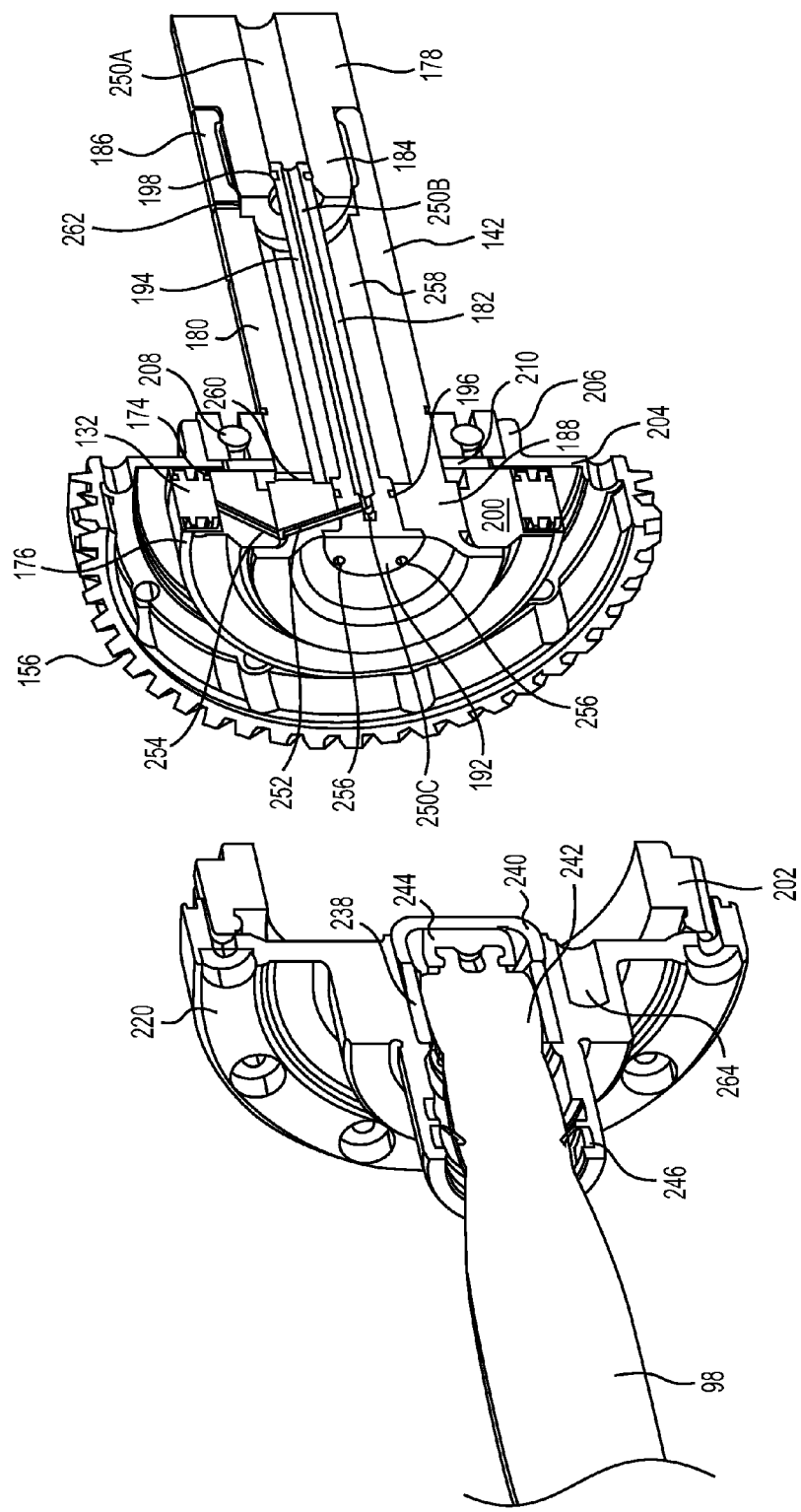
FIG. 14 is a partially exploded view of a clutch and associated elements of the propulsion system of FIG. 6.
Figure 15:
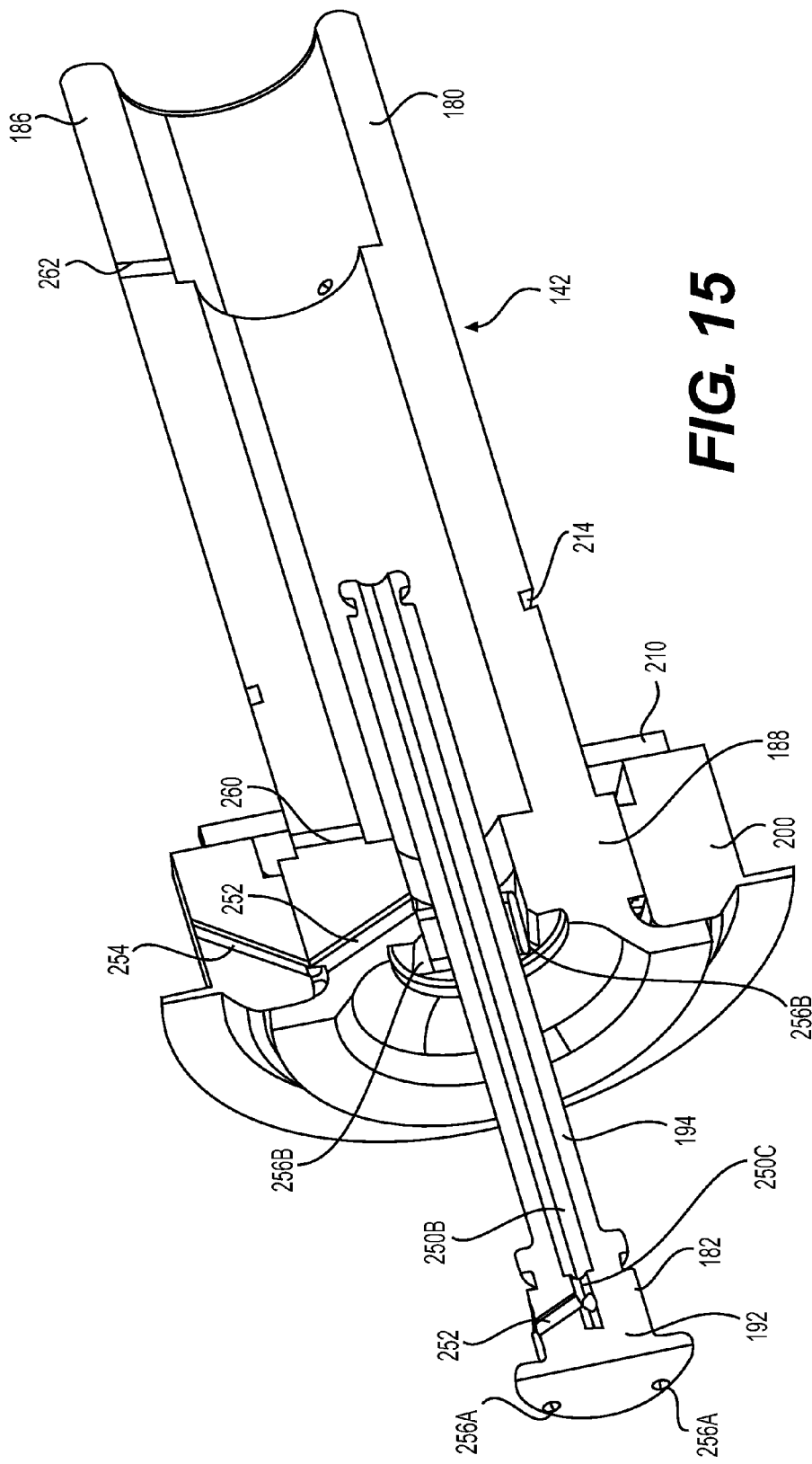
FIG. 15 is a partially exploded view of a portion of a crankshaft of the internal combustion engine of the propulsion system of FIG. 6.
Figure 16:
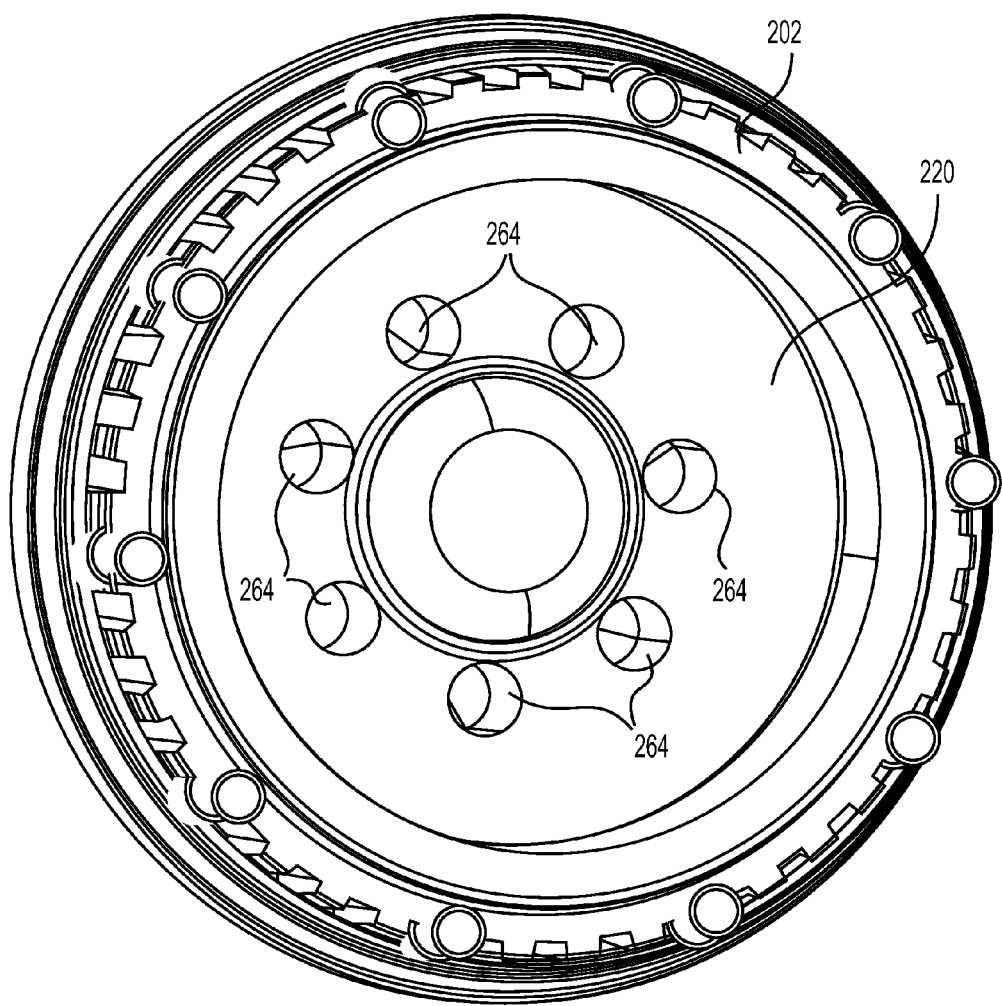
FIG. 16 is a perspective view taken from a front right side of a driveshaft connector a spacer of the propulsion system of FIG. 6.

As best seen in FIGS. 14 and 15, the crankshaft 142 is made of three parts 178, 180, and 182. It should be noted that only a portion of the part 178 is shown in FIGS. 9 to 14. The part 178 is disposed in the crankcase 134 and has an end 184 having an external threaded surface. The part 180 is hollow. The part 180 has an end 186 having an internal threaded surface that engages the external threaded surface of the end 184 of the part 178. It is contemplated that the internal threaded surface of the end 186 and the external threaded surface of the end 184 could be replaced by internally and externally splined surfaces respectively. The end 188 of the part 180 has external splines. The part 180 extends from inside the crankcase 134, through the end of the crankcase 134 and the magneto cover 140. A seal 190 (FIG. 13) is disposed between the magneto cover 140 and the part 180 of the crankshaft 142 to prevent lubricant from exiting the engine 100 around the part 180 of the crankshaft 142. The part 182 has a cap 192 and a hollow rod 194 extending from the cap 192. The part 182 is inserted in the part 180 such that the cap 192 is received in the end 188 of the part 180 and the end of the hollow rod 194 is received inside the end 184 of the part 178. An O-ring 196 is disposed between the cap 192 of the part 182 and the end 188 of the part 180. Another O-ring 198 is disposed between the end of the hollow rod 194 of the part 182 and the end 184 of the part 178. It is contemplated that the crankshaft 142 could alternatively be made of a single part, two parts or more than three parts.

A spacer 200 is disposed over the end 188 of the part 180 of the crankshaft 142. The spacer 200 has internal splines that engage the external splines of the end 188 of the part 180 of the crankshaft 142. The inner race 174 of the overrunning clutch 132 is press-fit on the outer surface of the spacer 200. Another spacer 202 is press-fit on the outer surface of the outer race 176 of the overrunning clutch 132. The spacer 202 has external splines (see FIG. 16). The pulley 156 is disposed over the spacer 202 such that the overrunning clutch 132 is disposed inside the pulley 156. The pulley 156 has internal splines (not shown) that engage the external splines of the spacer 202. It is contemplated that the internal splines of the pulley 156 and the external splines of the spacer 202 could be omitted. The pulley 156 has an annular wall 204 disposed in front of the spacer 202, the overrunning clutch 132 and a portion of the spacer 200. The pulley 156 also has a lip 206 extending forwardly from the wall 204. A ball bearing 208 is disposed between the lip 206 and the part 180 of the crankshaft 142. A spacer 210 is disposed between the ball bearing 208 and the spacer 200. A C-clip 212 is disposed in a groove 214 (FIG. 15) in the part 180 of the crankshaft 142 in front of the ball bearing 208. A cover 216 is disposed over the lip 206 of the pulley 156 and the ball bearing 208. A seal 218 is disposed between the cover 216 and the part 180 of the crankshaft 142 to prevent lubricant from passing between the cover 216 and the crankshaft 142.

A driveshaft connector 220 is fastened with threaded fasteners 222 to the spacer 202 and the pulley 156. It is contemplated that the driveshaft connector 220 and the spacer 202 could be integrally formed. A lubricant chamber 224 is defined between the front of the driveshaft connector 220 and of a cap 240 (described below) on one side and the rear sides of the spacers 200, 202, of the overrunning clutch 132 and of the crankshaft 142 on the other. The lubricant chamber 224 will be discussed further below. A collar 226 is fastened to the housing 170. A bearing 228 is disposed between the driveshaft connector 220 and the collar 226. A seal 230 is disposed over the driveshaft connector 220 rearward of the bearing 228 and housing 170. A rubber boot 232 is fastened at its front by a clamp 234 on the seal 230 and at its rear by a clamp 236 on a tube (not shown) extending from the top portion 90 of the water intake ramp 88. The driveshaft 98 extends inside this tube to connect to the jet propulsion system 84. The rubber boot 232 prevents the water inside this tube from entering inside the hull 12.

A sleeve 238 having internal splines and the cap 240 are inserted in the center of the driveshaft connector 220. The end 242 of the driveshaft 98 in inserted inside the driveshaft connector 220 and the sleeve 238. The end 242 of the driveshaft 98 has external splines that engage the internal splines of the sleeve 238. A rubber cap 244 is clipped on the end 242 of the driveshaft 98 to dampen impacts that may occur between the driveshaft 98 and the cap 240. A seal 246 is disposed between the rear end of the driveshaft connector 220 and the crankshaft 98. The seal 246 prevents water from entering the driveshaft connector 220 and prevents lubricant from leaving the driveshaft connector 220.

Figure 17:
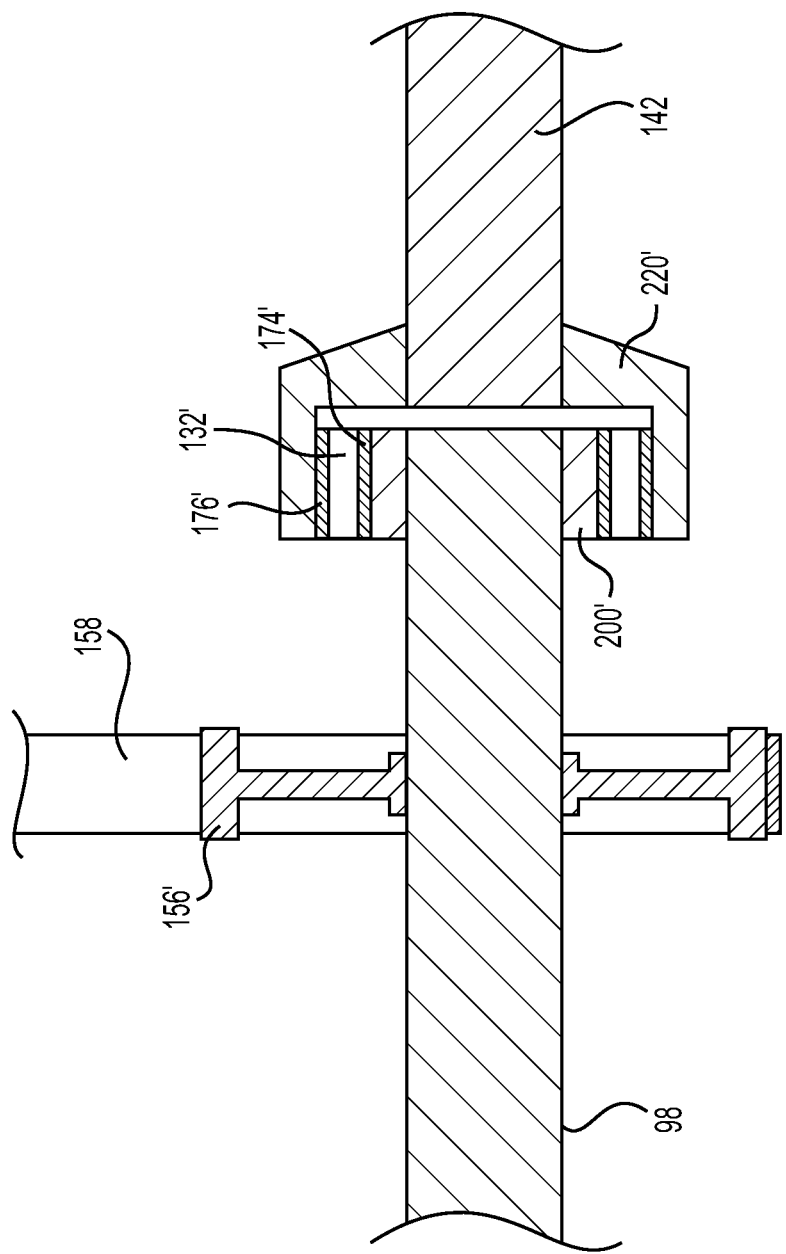
FIG. 17 is a schematic cross-sectional view of an alternative embodiment of a connection between the electric motor, internal combustion engine, and clutch of the propulsion system of FIG. 6.

In the embodiment described above, the crankshaft 142 of the engine 100 is connected to the inner race 174 of the overrunning clutch 132, the motor output shaft 152 is connected, via the pulleys 154, 156 and the belt 158, to the outer race 176 of the overrunning clutch 132, and the driveshaft 98 is connected, via the driveshaft connector 220, to the outer race 176 of the overrunning clutch 132. It is contemplated that the crankshaft 142 could be connected to the outer race of an overrunning clutch and the motor output shaft 152 and driveshaft 98 could be connected to the inner race of an overrunning clutch. FIG. 17 schematically illustrates such an embodiment. In FIG. 17, an overrunning clutch 132' has an inner race 174' and an outer race 176'. The overrunning clutch 132' is arranged so as to permit the inner race 174' to be rotated faster than the outer race 176' in the normal direction of rotation of the crankshaft 142 and to permit the inner race 174' and outer race 176' to rotate together in the normal direction of rotation of the crankshaft 142 by having the outer race 176' drive the inner race 174'. The crankshaft 142 is connected to the outer race 176' by a crankshaft connector 220'. A spacer 200' is disposed between the inner race 174' and the end of the driveshaft 98. A pulley 156' is connected to the driveshaft 98 rearward of the overrunning clutch 132'. As such the pulley 156' is connected to the inner race 174' via the driveshaft 98 and the spacer 200'. The pulley 156' is connected via the belt 158 to the pulley 154 disposed on the motor output shaft 152 of the motor 102. It is contemplated that the spacer 200' and the pulley 156' could be integrally formed.

Turning back to FIGS. 12 to 16, a system for lubricating the overrunning clutch 132 will be described. When the engine 100 is in operation, the lubricant pump 144 pump lubricant from the crankcase 134 into a lubricant passage 250 defined in the crankshaft 142. The passage 250 has a circular cross-section and is centrally disposed in the crankshaft 142. The passage 250 has a portion 250A defined in the part 178, a portion 250B having a smaller diameter defined in the rod 194 of the part 182 and a portion 250C having an even smaller diameter defined in the cap 192 of the part 182. As can be seen the portions 250A, 250B and 250C extend axially in the crankshaft 142. From the lubricant passage 250, and more specifically portion 250C of the passage 250, lubricant flows in three lubricant passages 252 (only one of which is shown) defined in the crankshaft 142. More specifically, the passages 252 are defined in the cap 192 of the part 182 and the end 188 of the part 180. The passages 252 are disposed at 120 degrees from each other. The passages 252 extend radially and away from the engine 100 as they extend away from the crankshaft axis. From the passages 252, lubricant flows in three lubricant passages 254 (one passage 254 in fluid communication with each passage 252) defined in the spacer 200. The passages 254 extend radially and toward the engine 100 as they extend away from the crankshaft axis. From the lubricant passages 254, the lubricant flows to the overrunning clutch 132 to lubricate the overrunning clutch 132.

From the overrunning clutch 132, lubricant flows into the lubricant chamber 224 described above. Lubricant in the space between the cap 240 and the cap 192 of the part 182 of the crankshaft 142 flows into four axially extending lubricant passages 256 (only two of which are shown) defined in the end of the crankshaft 142. The passages 256 are disposed at 90 degrees from each other. As best seen in FIG. 15, the passages 256 have a portion 256A defined in the cap 192 of the part 182 of the crankshaft 142 and a portion 256B defined in the end 188 of the part 180. From the passages 256 lubricant flows in a lubricant passage 258 defined between the part 180 of the crankshaft 142 and the rod 194 of the part 182 of the crankshaft 142. As such, the lubricant passage 258 has an annular cross-section. A portion of the lubricant in the passage 258 flows through three radially extending lubricant passages 260 (only one of which is shown) defined in the part 180 of the crankshaft 142. The passages 260 are disposed at 120 degrees from each other. From the passages 260, lubricant flows in the space defined between the spacer 200, the lip 206, the cover 216, the seal 218 and the part 180 of the crankshaft 142 in order to lubricate the bearing 208. It is also contemplated that lubricant could flow to the bearing 208 from the overrunning clutch 132. Another portion of the lubricant in the passage 258 flows through three radially extending lubricant passages 262 (only two of which are shown) defined in the part 180 of the crankshaft 142. The passages 262 are disposed at 120 degrees from each other. From the passages 262, the lubricant flows back into the crankcase 134.

It is contemplated that more or less (where applicable) of each type of lubricant passage described above could be provided. It is also contemplated that a similar type of system could be used to provide lubricant from the crankshaft of an internal engine to a clutch of a type other than an overrunning clutch used in other hybrid propulsion systems.

As described above, the lubricant pump 144 is a mechanical pump driven by the crankshaft 142. As such, when the propulsion system 130 operates in the motor mode, the lubricant pump 144 stops pumping lubricant. In order to ensure that a sufficient amount of lubricant remains in the lubricant chamber 224 in order to lubricate the overrunning clutch 132 while operating in the motor mode, the driveshaft connector 220 defines seven circular recesses 264 (see FIG. 16) communicating with the chamber 224. The recesses 264 increase the volume of the chamber 224 and therefore the volume of lubricant in the chamber 224. It is contemplated that the recesses could have a different shape and that there could be more or less recesses 264. For example, it is contemplated that the seven circular recesses 264 could be replaced by a single annular recess.

It is contemplated that a watercraft only having an internal combustion engine could be converted to have the hybrid propulsion system 130 described above. To convert the watercraft, the existing driveshaft is disconnected from the crankshaft of the engine. The overrunning clutch 132, the pulley 156, the driveshaft connector 220 and their associated components are mounted to the end of the crankshaft as in the propulsion system 130 described above. The belt 158 is then disposed around the pulley 156. The motor mount 170 is then fastened to the hull. The driveshaft is then inserted in the driveshaft connector 220. It is contemplated that the original driveshaft may have to be replaced by a driveshaft having a different length in order to fit between the driveshaft connector 220 and the impeller shaft 112. The motor 102, with the pulley 154 mounted on the motor output shaft 152, is mounted to the motor mount 170. The belt 158 is then disposed around the pulley 154 and the position of the motor 102 is adjusted to provide the proper tension in the belt 158.

In order to lubricate the overrunning clutch 132, a separate lubrication system can be provided. Alternatively, the existing crankshaft of the engine can be modified to supply lubricant from the crankshaft to the overrunning clutch. Most crankshafts already have a lubricant passage therein in order to supply lubricant to the bearings supporting the crankshaft in the crankcase. Such crankshaft often have one part defining the passage and having an opened end and another part having a closed end mounted over the first part to prevent lubricant from exiting the crankshaft. The part having the closed end is the part to which the driveshaft normally connects. To make the conversion, the part of the crankshaft having the closed end is replaced by a crankshaft adapter consisting of parts such as the parts 180, 182 of the crankshaft 142 described above defining the various passages described above in order to provide the necessary lubrication. For crankshafts having other constructions, the original crankshaft can be machined and then provided with the crankshaft adapter, or the crankshaft is replaced with the crankshaft 142. It is contemplated that crankshaft adapters could also be used to supply lubricant from the crankshaft of the engine to another type of clutch used in another type of hybrid propulsion system.

The components described above used to convert the watercraft having only an internal combustion system to have a hybrid propulsion system such as the system 130 described above together define a hybrid propulsion conversion system for a watercraft.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A watercraft comprising:
a hull;
a deck disposed on the hull;
a driveshaft disposed in part between the hull and the deck;
one of an impeller and a propeller connected to the driveshaft;
an overrunning clutch having a first race and a second race, the first race being one of an inner race and an outer race, the second race being an other one of the inner race and the outer race, the first race being connected to the driveshaft for driving the driveshaft;
an electric motor having a motor output shaft operatively connected to the first race, the electric motor being disposed between the hull and the deck, the electric motor being disposed above the driveshaft;
at least one battery connected to the electric motor; and
an internal combustion engine having an engine output shaft operatively connected to the second race, the internal combustion engine being disposed between the hull and the deck,
the driveshaft, the overrunning clutch and the engine output shaft being coaxial,
the driveshaft and the electric motor being disposed on a first side of the overrunning clutch,
the internal combustion engine being disposed on a second side of the overrunning clutch, the second side being opposite the first side, and
the overrunning clutch being connected to the motor output shaft and the engine output shaft such that the electric motor selectively rotating the first race at a higher speed than the second race.

2. The watercraft of claim 1, wherein the first race is the outer race and the second race is the inner race.

3. The watercraft of claim 2, further comprising:
a first pulley connected to the motor output shaft;
a second pulley connected to the outer race; and
a belt disposed around the first pulley and the second pulley.

4. The watercraft of claim 3, wherein the outer race is disposed inside the second pulley.

5. The watercraft of claim 1, further comprising at least one control unit connected to the electric motor and the internal combustion engine,
the at least one control unit selectively operating the propulsion system between an engine mode and a motor mode,
when in the engine mode, the electric motor does not drive the first race, the internal combustion engine drives the second race, the second race drives the first race, and the first race drives the driveshaft and the motor output shaft,
when in the motor mode, the electric motor drives the first race, the first race drives the driveshaft, and the first race rotates faster than the second race.

6. The watercraft of claim 5, wherein when in the engine mode, the control unit selectively connects at least one battery used to supply power to the electric motor;
wherein when in the engine mode and the at least one battery is connected to the electric motor, the electric motor recharges the battery.

7. The watercraft of claim 6, wherein the at least one control unit selectively operates the propulsion system between the engine mode, the motor mode and an assisted engine mode,
when in the assisted engine mode, the electric motor drives the first race, the internal combustion engine drives the second race, the second race drives the first race, and the first race drives the driveshaft.

8. The watercraft of claim 5, wherein when in the motor mode, the control unit operates the internal combustion engine at idle speed or shuts downs the internal combustion engine.

9. The watercraft of claim 1, further comprising a straddle seat connected to the deck; and wherein the one of the impeller and the propeller is the impeller.

10. The watercraft of claim 1, wherein the motor output shaft is offset from the driveshaft.

11. The watercraft of claim 10, wherein the motor output shaft is parallel to the driveshaft.

12. The watercraft of claim 1, wherein the overrunning clutch is a sprag bearing.

13. The watercraft of claim 1, further comprising an engine starter selectively operatively connected to the internal combustion engine to start the internal combustion engine.

14. The watercraft of claim 1, wherein the engine output shaft is a crankshaft of the internal combustion engine.

\* \* \* \* \*